(12) United States Patent
Kobayashi et al.

(10) Patent No.: US 8,045,249 B2
(45) Date of Patent: Oct. 25, 2011

(54) OPTICAL SCANNING DEVICE

(75) Inventors: Masanori Kobayashi, Yokohama (JP); Hiroyoshi Funato, Chigasaki (JP); Kazuya Miyagaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 543 days.

(21) Appl. No.: 12/133,086

(22) Filed: Jun. 4, 2008

(65) Prior Publication Data
US 2008/0297870 A1 Dec. 4, 2008

(30) Foreign Application Priority Data
Jun. 4, 2007 (JP) .................................. 2007-148365

(51) Int. Cl.
*G02B 26/08* (2006.01)
(52) U.S. Cl. ........................ 359/204.3; 349/74
(58) Field of Classification Search ............... 359/201.1, 359/203.1, 204.1, 204.4, 212.1–215.1, 216.1–217.1, 359/196.1–226.3, 204.5; 349/74
See application file for complete search history.

(56) References Cited

U.S. PATENT DOCUMENTS
6,885,414 B1 * 4/2005 Li ..................................... 349/74
7,145,705 B2 * 12/2006 Hayashi ...................... 359/204.1
2006/0039068 A1 * 2/2006 Tokita et al. .................. 359/483

FOREIGN PATENT DOCUMENTS
| CN | 1886691 A | 12/2006 |
| JP | 62-238514 | 10/1987 |
| JP | 08-110489 | 4/1996 |
| JP | 8-118726 | 5/1996 |
| JP | 2005-92129 | 4/2005 |
| JP | 2005-157109 | 6/2005 |

\* cited by examiner

*Primary Examiner* — Jennifer L. Doak
(74) *Attorney, Agent, or Firm* — Cooper & Dunham LLP

(57) ABSTRACT

An optical scanning device including a light source, a deflection device to deflect a light beam from the light source, an image focus optical system to focus the light beam deflected by the deflection device on a scanned surface to form an image thereon and scan a surface by the light beam deflected by deflection device to form an image thereon, a light path switching device provided between the light source and the deflection device, which switches a light path of the light beam emitted from the light source to deflect the light beam on different timings such that the light beam scans different surfaces.

1 Claim, 24 Drawing Sheets

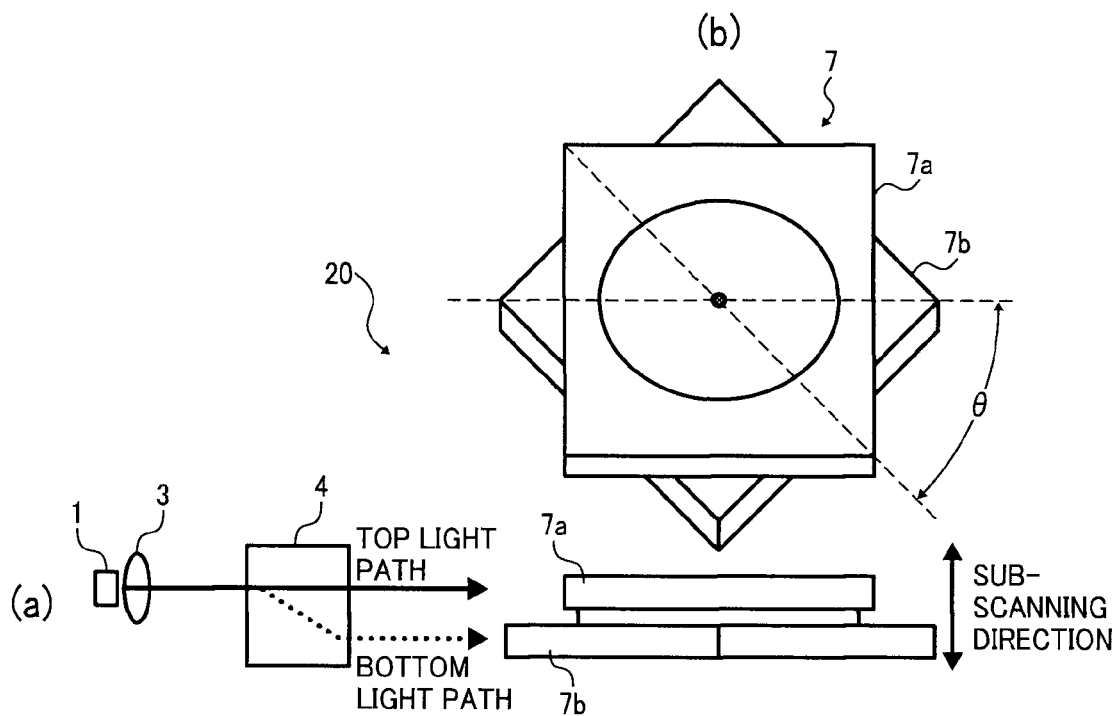
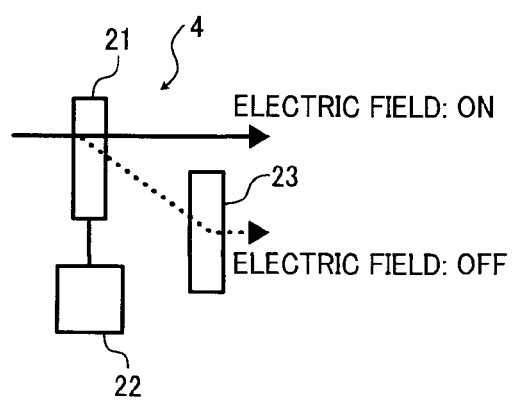

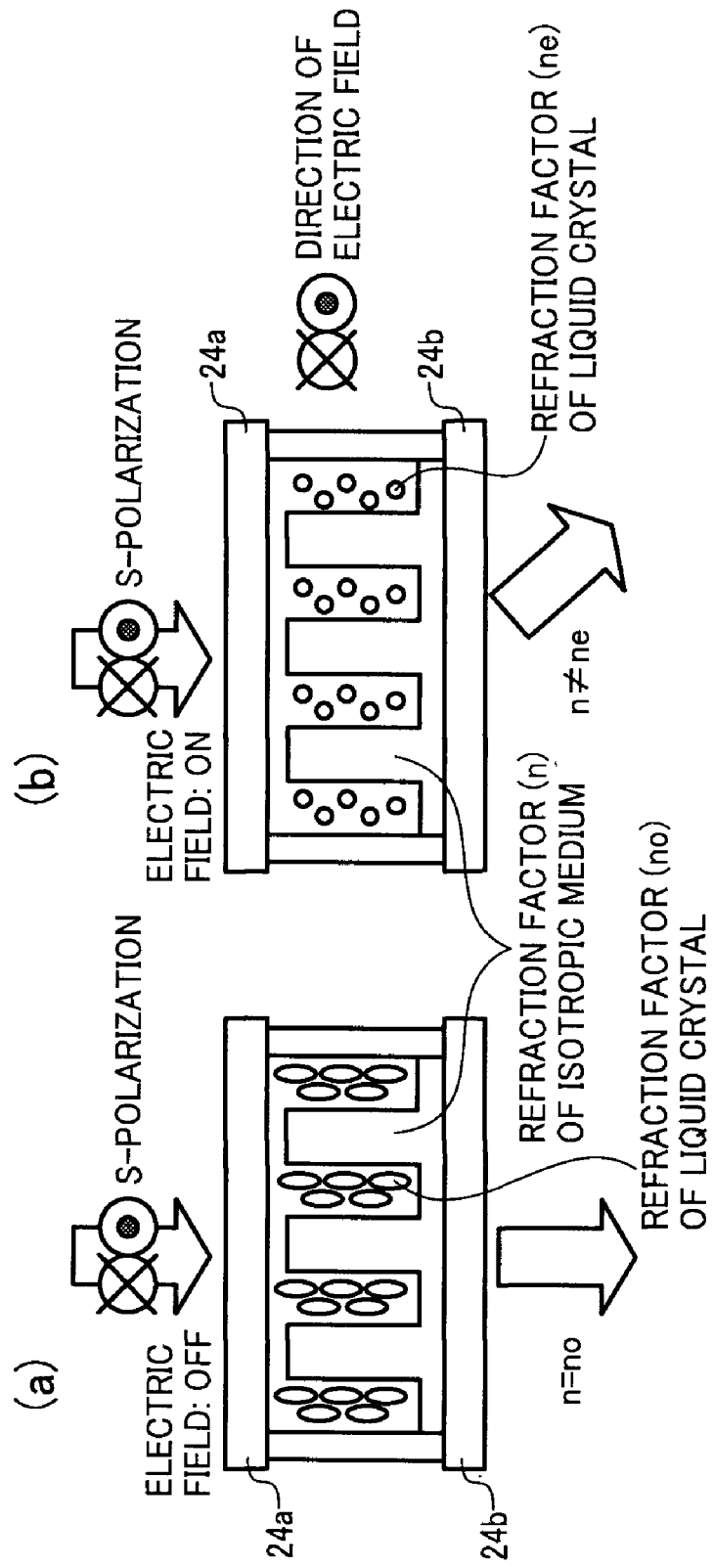

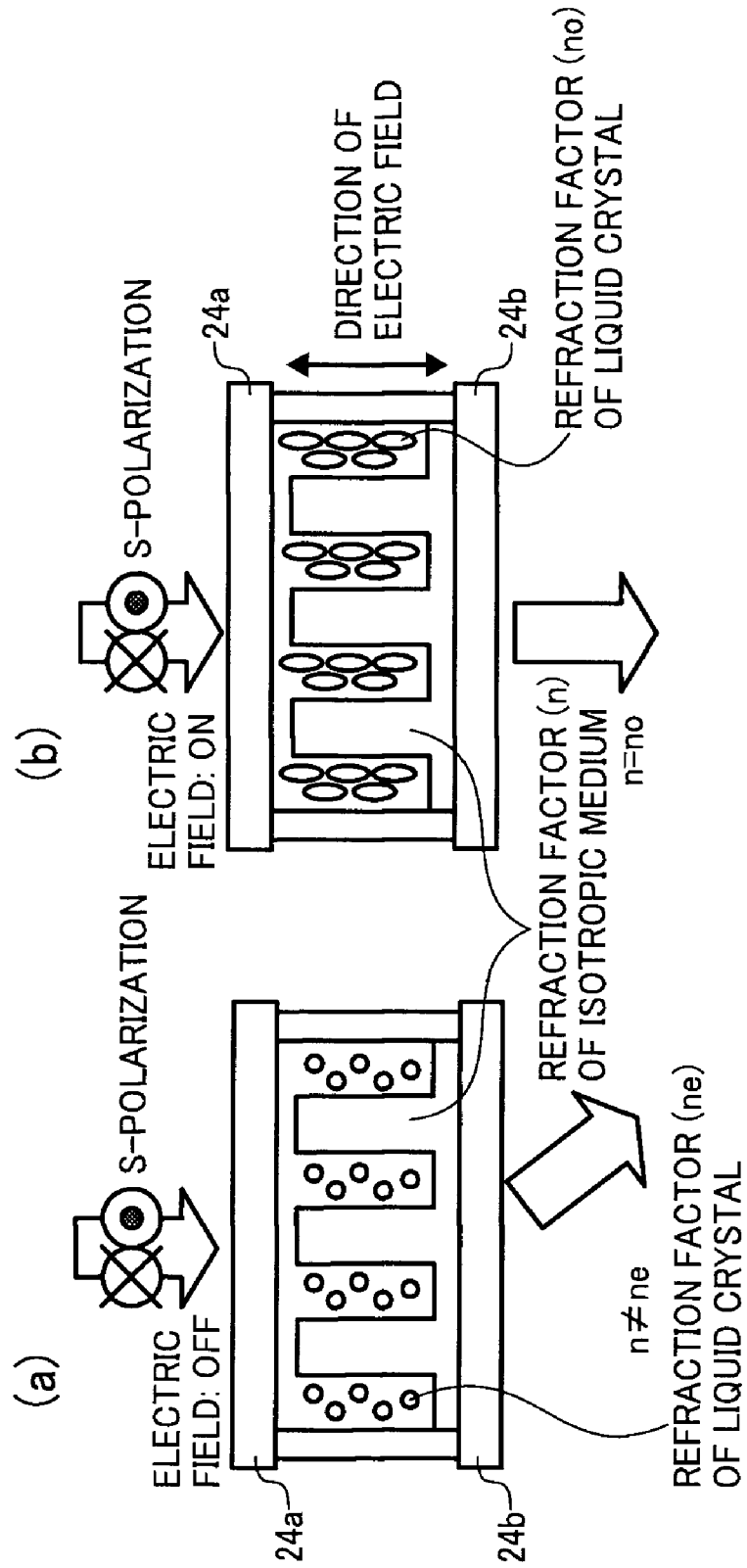

s-POLARIZATION

DIRECTION OF ELECTRIC FIELD

ELECTRIC FIELD: ON s-POLARIZATION

ELECTRIC FIELD: OFF

⊕
⊙ : DIRECTION OF INTRINSIC POLARIZATION
W: NORMAL LINE DIRECTION OF SMECTIC LAYER
n: MAJOR AXIS (DIRECTOR) DIRECTION OF LIQUID CRYSTAL MOLECULE
θ: TILT ANGLE (2θ: CONE ANGLE)

−E: ORIENTATION STATE 1

OUTPUT POLARIZATION d

INCIDENT POLARIZATION

+E: ORIENTATION STATE 2

45° d

OUTPUT POLARIZATION (90° ROTATION FROM INCIDENT POLARIZATION)

INCIDENT POLARIZATION

TEMPERATURE CHARACTERISTIC OF RESPONSE SPEED (±20v/μm)

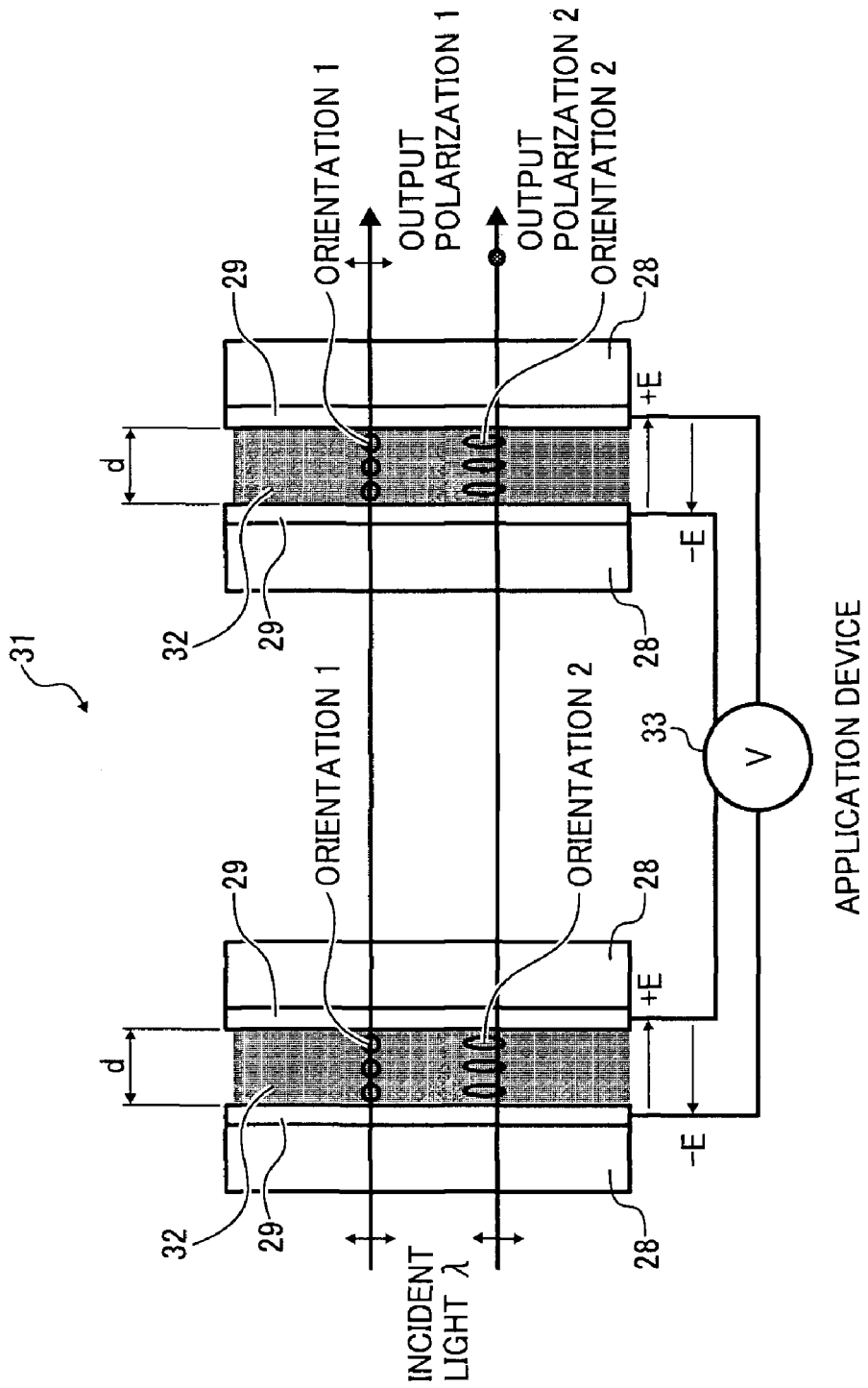

OPTICAL SCANNING DEVICE

BACKGROUND OF THE INVENTION

1. Field of the Invention

The present invention relates to an optical scanning device.

2. Discussion of the Background

With the advance of colorization and high speed performance in an electrophotographic image forming apparatus for use in a laser printer, a digital copier and a facsimile machine, a tandem type image forming apparatus, which has multiple (typically four) image bearing members, has been widely diffused.

As a color image forming apparatus, there is a system which has only one image bearing member and rotates the image bearing member a number of times corresponding to the number of colors. For example, in the case of one image bearing member and four colors, the image bearing member is required to rotate four times, meaning the productivity thereof is inferior.

On the other hand, in an image forming apparatus adopting a tandem arrangement, the number of the light sources inevitably increases. This leads to an increase in the number of component parts, color displacement caused by differences between wavelengths among multiple light sources and an overall cost increase. In addition, deterioration of a semiconductor laser leads to a breakdown of a writing unit (optical scanning device).

As the number of light sources increases, the probability of breakdown naturally increases and thus the opportunity to recycle decreases. This demerit is especially significant when a surface-emitting laser or an D array is used as a light source.

As an optical scanning device which outputs images at a high speed with a small number of light sources, there is known a system described in published unexamined Japanese patent application No. (hereinafter referred to as JOP) 2005-92129.

In this system, the light beam (hereinafter referred to as beam) from a common light source is separated and the respective separated beams are simultaneously directed onto reflection mirrors located in different stacks in a sub-scanning direction (a direction orthogonal to a main scanning direction) to scan different surfaces.

However, in the system described above, beam power from a common light source is reduced to about a half when separated, with a concomitant decrease in the efficiency of the light source power. Consequently, this system requires at least double the power used in a system using a multiple light source arrangement. The increase in power leads to deterioration of the laser beam source and further causes a breakdown of the writing unit.

The deterioration of the laser beam source invites deterioration of writing performance (i.e., deterioration in reliability) and degrades image quality.

SUMMARY OF THE INVENTION

Because of these reasons, the present inventors recognize that a need exists for an optical scanning device which outputs quality images while improving reliability, reducing cost, and extending working life of the laser beam source without loss of beam power with a small number of light sources. Accordingly, an object of the present invention is to provide an optical scanning device which outputs quality images, improves reliability, reduces cost, and extends a working life of the laser beam source without loss of beam power with a small number of light sources. Briefly this object and other objects of the present invention as hereinafter described will become more readily apparent and can be attained, either individually or in combination thereof, by an optical scanning device including a light source, a deflection device to deflect a light beam from the light source, an image focus optical system to focus the light beam deflected by the deflection device on a scanned surface to form an image thereon and a light path switching device provided between the light source and the deflection device, which is configured to switch a light path of the light beam emitted from the light source to vary a timing with which the light beam is deflected so as to scan different surfaces.

It is preferred that, in the optical scanning device described above, the light path switching device includes a first diffraction area in which a refraction factor varies depending on an application of an acting force and a second diffraction area in which diffracted light from the first diffraction area is diffracted to reach a particular portion of the deflection device.

It is still further preferred that, in the optical scanning device described above, the second diffraction area includes a structure in which a refraction factor varies depending on application of an acting force.

It is still further preferred that, in the optical scanning device described above, the first diffraction area and the second diffraction area have the same diffraction structure.

It is still further preferred that, in the optical scanning device described above, at least one of the first diffraction area and the second diffraction area has an area including a non-polymeric liquid crystal and an area including an isotropic medium which are cyclically alternated, and a refraction factor of the area including a non-polymeric liquid crystal to a particular polarization direction varies depending on application of the acting force such that the light beam in the particular polarization direction is transmitted or deflected according to the application of the acting force.

It is still further preferred that, in the optical scanning device described above, at least one of the first diffraction area and the second diffraction area is a holographic polymer dispersed liquid crystal (HPDLC) element which includes a phase separation structure for an area including a polymer and an area including a non-polymeric liquid crystal cyclically alternated.

It is still further preferred that, in the optical scanning device described above, the light path switching device includes a first diffraction optical element in which a refraction factor varies depending on application of an acting force and a second diffraction optical element which diffracts a light beam diffracted by the first diffraction optical element such that the light beam reaches a particular portion of the deflection device.

It is still further preferred that, in the optical scanning device described above, the second diffraction optical element has a structure in which a refraction factor varies depending on application of an acting force.

It is still further preferred that, in the optical scanning device described above, the first diffraction optical element and the second diffraction optical element have the same diffraction structure.

It is still further preferred that, in the optical scanning device described above, at least one of the first diffraction optical element and the second diffraction optical element includes an area including a non-polymeric liquid crystal and an area including an isotropic medium which are cyclically repeated, and a refraction factor of the area including a non-polymeric liquid crystal to a particular polarization direction varies upon application of the acting force such that a light in the particular polarization direction is transmitted or diffracted according to the application of the acting force.

It is still further preferred that, in the optical scanning device described above, at least one of the first diffraction optical element and the second diffraction optical element is a holographic polymer dispersed liquid crystal (HPDLC) element having a phase separation structure of an area including a polymer and an area comprising a non-polymeric liquid crystal cyclically alternated.

It is still further preferred that the optical scanning device described above further includes an electric field application device which applies an electric field as the application of acting force.

It is still further preferred that, in the optical scanning device described above, the deflection device is a multiple of reflecting mirrors comprising a common rotation axis and multiple stacks provided in a sub-scanning direction.

It is still further preferred that the optical scanning device described above further includes a temperature control device which maintains the temperature in the case of the optical scanning device in a particular range.

It is still further preferred that the optical scanning device described above further includes a temperature detection device which directly detects the temperature of the light path switching device, the polarization switching device or the polarization separation device and controls the temperature thereof based on a detection signal from the temperature detection device.

As another aspect of the present invention, an optical scanning device is provided which includes a light source, a deflection device to deflect light beam from the light source, an image focus optical system to focus an image on a surface scanned by the light beam deflected by the deflection device and a polarization switching device provided between the light source and the deflection device and in which a refraction factor varies depending on application of an acting force and a polarization separation device provided between the light source and the deflection device. In addition, a plurality of surfaces are scanned by varying a with which the light beam is deflected while a light path for the light beam from the light source is switched.

It is preferred that, in the optical scanning device described above, the polarization separation device is a deflection beam splitter prism.

It is still further preferred that, in the optical scanning device described above, the polarization separation device includes a first diffraction area and a second diffraction area, each of the first diffraction area and the second diffraction area having a periodical structure including an area having an optical anisotropy and an area having an optical isotropy, and separates orthogonal polarization components by transmission and diffraction.

It is still further preferred that, in the optical scanning device described above, the polarization separation device includes a first diffraction optical element and a second diffraction optical element, each including an area having an optical anisotropy and an area having an optical isotropy cyclically alternated, and separates orthogonal polarization compositions by transmission and diffraction.

It is still further preferred that, in the optical scanning device described above, the polarization switching device includes a pair of transparent substrates, an orientation film sandwiched between the transparent substrates on an inner side of the substrates, a liquid crystal layer a chiral smectic C phase layer having homogeneous orientation by the orientation film, and an acting force application device which applies an acting force in a substantially perpendicular direction relative to the transparent substrates.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 1 is a schematic diagram illustrating a main part of the optical scanning device related to the first embodiment described later, FIG. 1A is a cross section thereof and FIG. 1B is a perspective view of a deflection device in the optical scanning device;

FIG. 2 is a schematic diagram illustrating a structure and function of a light path switching device of the optical scanning device;

FIG. 4A is a top view thereof and FIG. 4B is a cross section thereof;

FIG. 5 is a diagram illustrating a behavior of the diffraction optical element illustrated in FIG. 4 which conducts diffraction function when the electric field application is applied thereto;

FIG. 6 is a diagram illustrating a behavior of the diffraction optical element illustrated in FIG. 4 which conducts diffraction function when the electric field application is not applied thereto;

FIG. 12A is a cross section thereof and FIG. 12B is a perspective view of a deflection device in the optical scanning device;

FIG. 18A is a square wave graph, and FIG. 18B is a pulse wave graph;

FIG. 19 is a schematic diagram illustrating a cross section of structure of the polarization switching device related to the this embodiment described later;

DETAILED DESCRIPTION OF THE INVENTION

The present invention will be described below in detail with reference to several embodiments and accompanying drawings.

As a comparison structure to the optical scanning device of the present invention, conventional examples of optical scanning devices are described with reference to FIGS. 31 to 34.

Figure 31:
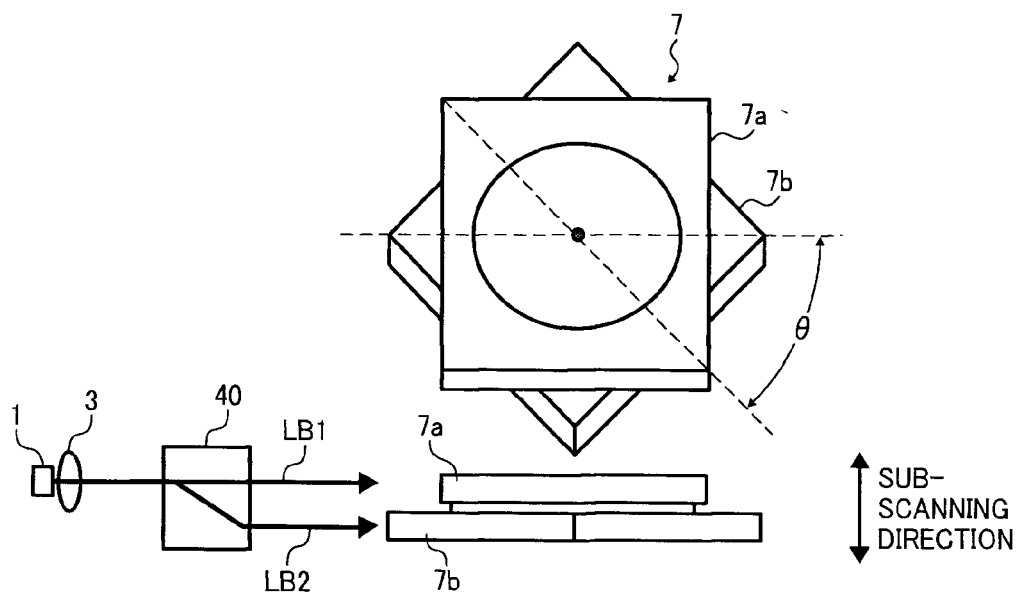
FIG. 31 is a schematic diagram of a typical optical scanning device, showing a lateral view thereof and a perspective view of the polarization device.

FIG. 31 is a diagram illustrating part of an optical scanning device. This optical scanning device includes a laser light source 1, a collimate lens 3, a light beam separation device 40, a polygon mirror (multifaceted reflection mirror) 7 having a common axis and two stacks, etc. Also a cylindrical lens (not shown) having a power in the sub-scanning direction is provided between the laser light source 1 and the polygon mirror 7. Furthermore, an optical image focus system which focuses the scanning light beams from the polygon mirror 7 on a scanned surface to form an image thereon is also omitted in FIG. 31.

As the light beam separation device 40 which divides the beam from the laser light source 1, a structure having a combination of a half mirror prism and a diffraction optical element can be used but the detail description thereof is omitted.

The behavior of the optical scanning device is described below. The beam emitted from the laser light source 1 is divided into two beams (a beam LB1 for the top stack 7a and a beam LB2 for the bottom stack 7b) in the sub-scanning direction (up and down direction of sheet) by the light beam separation device 40. The respective two separated beams are incident into the polygon mirrors 7a and 7b. The polygon mirrors 7a and 7b are angled with an angle of θ from each other relative to the rotation direction. In this example, the four faceted polygon mirrors 7a and 7b are angled at an angle of 45°.

Figure 32A:
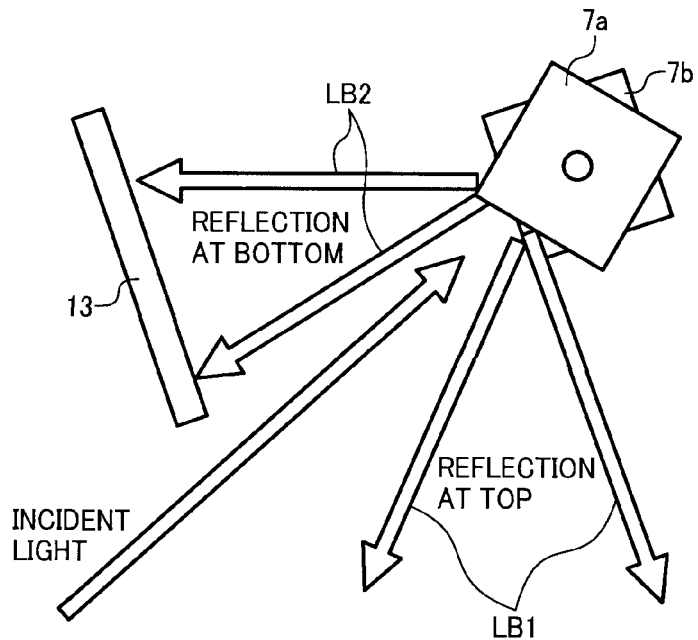
FIG. 32 is a diagram illustrating the polarization scanning state of the light beam in a typical optical scanning device.
Figure 32B:
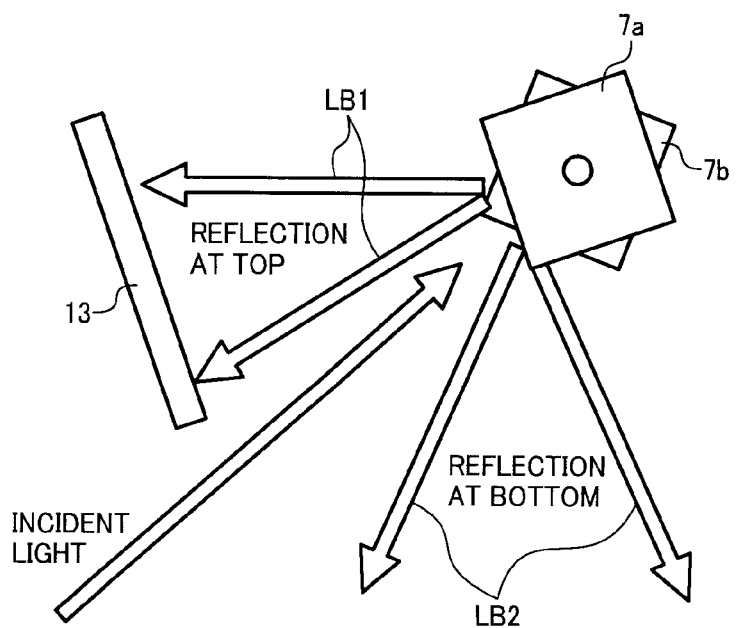

In this structure, as illustrated in FIG. 32, when the beam LB1 for the top stack scans the surface of an image bearing member, the beam LB2 for the bottom stack does not reach the surface of the image bearing member. It is preferred to block the beam LB2 by a light shielding member 13. Also, when the beam LB2 for the bottom stack scans the surface of an image bearing member, the beam LB1 for the top stack does not reach the surface of the image bearing member.

Furthermore, the laser light source 1 is modulation driven on different timing for the top and bottom stacks. When the image bearing member corresponding to the top stack is scanned, the laser light source 1 is modulation driven based on the image information of the color (e.g., black) corresponding to the top stack. When the image bearing member corresponding to the bottom stack is scanned, the laser light source 1 is modulation driven based on the image information of the color (e.g., magenta) corresponding to the bottom stack.

Figure 33:
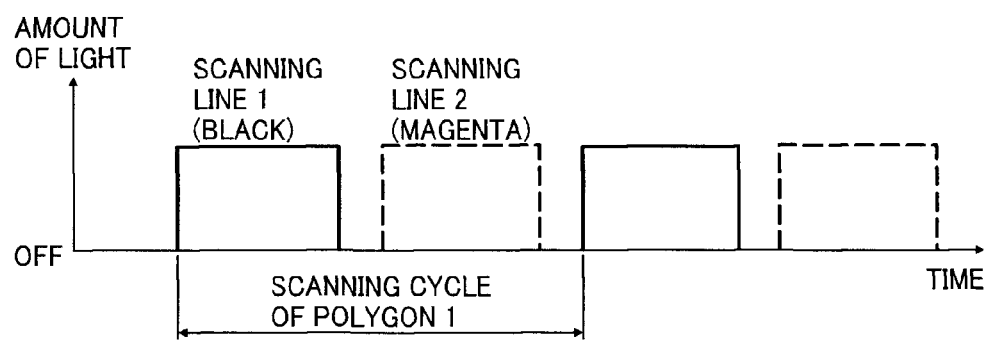
FIG. 33 is a timing chart illustrating the irradiation timing for multiple colors.
Figure 34:
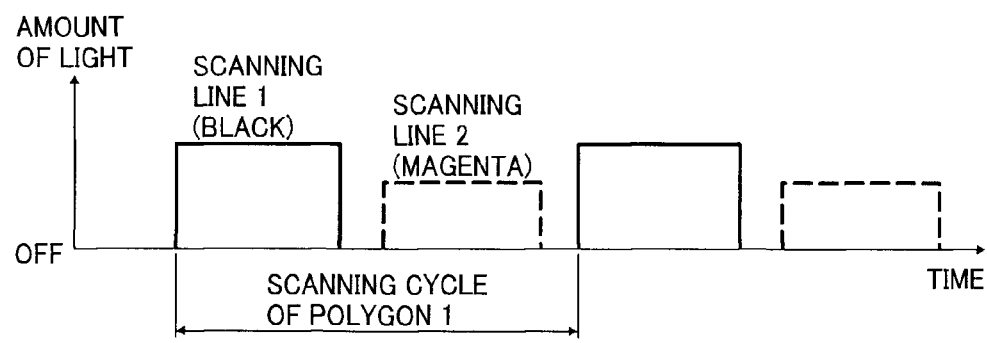
FIG. 34 is a timing chart illustrating the case in which the irradiation amount varies depending on the colors.

FIGS. 33 and 34 are time charts of when irradiation of black and magenta is performed by the common laser light source 1 and all is on in the effective scanning area. The solid line corresponds to black portions and the dotted line corresponds to magenta portions. The timing of starting writing black and magenta is determined by detecting the scanning beam by a synchronization light receptive device (not shown) provided outside the effective scanning width. Normally, a photodiode is used as the synchronization light receptive device.

In FIG. 33, the amount of light is set to be the same in the black area and the magenta area. However, since the transmission ratio and the reflection index of the optical elements are different, the amount of light which reaches an image bearing member is different when the amount of light of the laser light source 1 is the same. Therefore, as shown in FIG. 34, the amount of light for respective colors is set to be different from each other when scanning different image bearing members to make the amount of light the same when the respective beams reach different image bearing members.

When the light beam separation device 40 is used, the beam emitted from the common laser light source 1 is divided into two to produce multiple beams. However, as described above, while an image bearing member is scanned by a one separated beam, the other separated beam does not reach the surface of the image bearing member, meaning that substantially a half of the amount of the light beam is lost. Therefore, it is actually inevitable to make the power of the laser light source large.

Such an increase in the power of the laser light source 1 causes deterioration thereof, which leads to a short working life thereof, and increases the consumption power.

Figure 29:
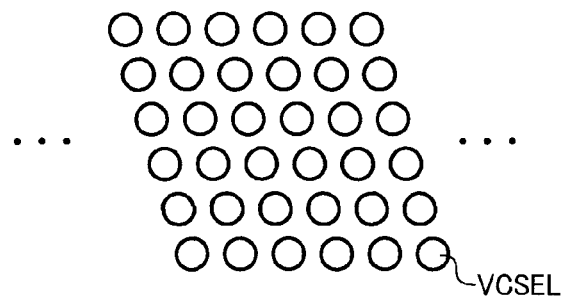
FIG. 29 is a diagram illustrating the schematic structure of the VCSEL array as the light source.

This is significant especially when a laser having a high density such as a surface emitting laser (VCSEL) as illustrated in FIG. 29 is used as the light source.

That is, high definition is made possible by arranging a great number of minute VCSELs in VCSEL arrays but since each VCSEL is low heat resistant and the pitch between them is small, VCSELs tend to deteriorate by the heat generated from each other when the power increases.

In the present invention, it is possible for one element to contain two or more diffraction areas or have a structure united with another element such as a polarization switching element. The diffraction optical element described later represents that one element contains one diffraction areas and in the present invention, two or more diffraction optical elements are used. In this specification, the structure having two diffraction optical elements as a light switching device described later are described in detail. However, as long as the light path switching function is secured, one element having a first diffraction area and a second diffraction area is usable. In such a structure, the number of the elements is one, meaning a small size. This is advantageous to have a wide latitude of designing in light of element arrangement in an optical system.

A first embodiment of the present invention is described which deals with the phenomenon described above. The devices and portions which are the same as or corresponds to those in the conventional example are numbered the same.

FIG. 1 represents part of the optical scanning device related to the first embodiment. An optical scanning device 20 (also refer to FIGS. 28 and 30) includes the laser light source 1, a light path switching device 4, the polygon mirror 7 formed of multiple stacks with one axis in common, etc. In FIG. 1, a cylindrical lens and an optical image focus system are omitted as in the comparison structure described above.

As illustrated in FIG. 2, the light path switching device 4 includes a first diffraction optical element 21 by which the refraction factor varies upon application of an electric field as an acting force, an electric field application device 22 which functions as an acting force to apply an electric field to the first diffraction optical element 21 and as a liquid crystal driving force and a second diffraction optical element 23. The light beam passes different paths depending on whether or not an electric field is applied.

The behavior of the optical scanning device 20 is described below.

The beam path is shifted in parallel for the top stack light path and the bottom stack light path in the sub-scanning direction by controlling the application of an electric field in the light path switching device 4. The beam emitted from the laser light source 1 is incident into the polygon mirrors 7a and 7b provided in the top stack and the bottom stack on different timings based on a time splitting way.

In the control of application of an electric field, the beam passes through the top light path when the electric field is applied and the beam passes through the bottom light path when the electric field is not applied. It is also possible to set a structure in the other way round. The polygon mirrors 7a and 7b of the top and the bottom stacks have four facets and are angled with an angle of 45° from each other as in the conventional example described above.

Figure 3A:
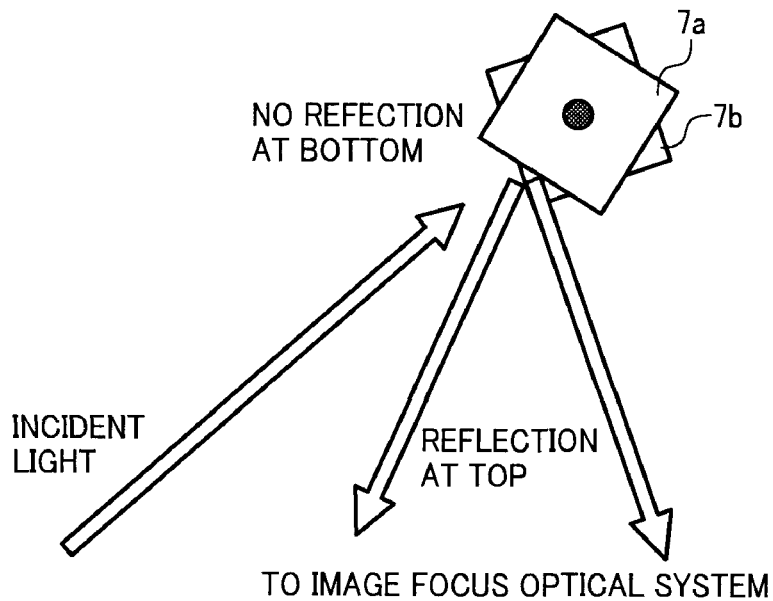
FIGS. 3A and 3B are diagrams illustrating polarization scanning of a light beam which has passed the light path switching device, respectively showing a reflection state by a polygon mirror provided at top and a reflection state by a polygon mirror provided at bottom.

In the structure, as illustrated in FIG. 3A, by controlling the application of an electric field in the light path switching device 4, when the beam from the top stack polygon mirror 7a scans surface of the image bearing member, the beam substantially passes only the top light path and does not pass the bottom light path.

Figure 3B:
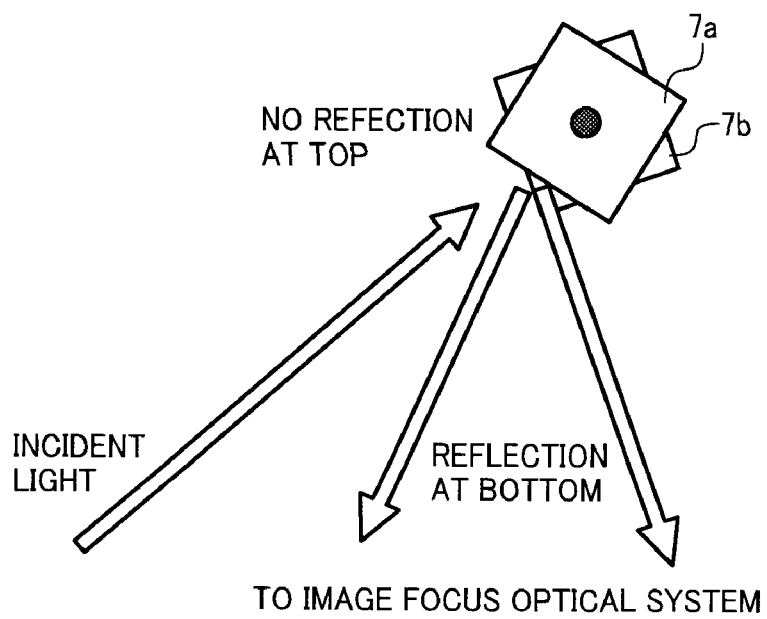

Also, as illustrated in FIG. 3B, when the beam from the bottom stack polygon mirror 7b scans the surface of the image bearing member, the beam substantially passes only the bottom light path and does not pass the top light path.

That is, the beam emitted from the laser light source 1 is used without dividing the beam and the light path is switched based on timing so that the two light paths are used alternatively without a loss of the amount of the light beam. Thus, the light source power can be efficiently used.

This leads to extension of working life and reduction of probability of deterioration. This effect is significant especially when a surface emitting laser, which is effective for increasing density, is used as a light source.

In addition, to prevent an adverse effect caused by returning light incident into the laser light source 1, the light shield member 13, a light isolator (not shown) by a $\lambda/4$ plate, etc., are used in a conventional system. In this embodiment, since a light beam does not reflect while another light beam is scanning, there is no need to use the light shield member 13 or a light isolator and the problem of returning light does not occur.

Figure 4:
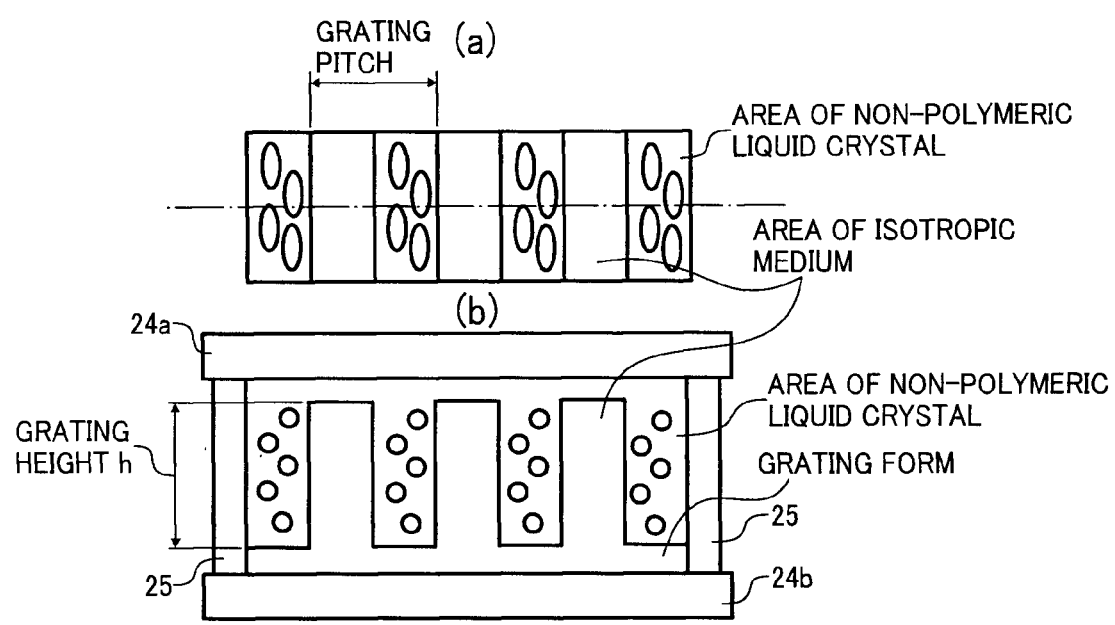
FIG. 4 is a schematic diagram illustrating a diffraction optical element of the optical scanning device.

FIG. 4 is a diagram schematically illustrating the diffraction optical element included in the light path switching device 4.

The diffraction optical element has a periodical structure of an area of a non-polymeric liquid crystal and an area of an isotropic medium between a pair of substrates 24a and 24b. The reference numeral 25 represents a supporting member. The periodical structure can be made by forming a grating form by photolithography and etching, cutting work or molding technology followed by filling a non-polymeric liquid crystal material among the gratings.

With regard to the diffraction optical element, known liquid crystal type such as nematic, cholesteric and smectic can be used as the non-polymeric liquid crystal. Specific examples of the isotropic media include transparent resins such as photopolymers, and optical glass materials such as quartz, soda glass, white glass and BK7 but are not limited thereto as long as the isotropic medium does not have birefringence.

In addition, it is preferred that when a diffraction optical element is manufactured, an electrode (not shown) which can apply an electric field to regulate the orientation direction of the liquid crystal and an orientation film (not shown) are provided and orientation treatment such as rubbing and optical orientation is conducted to effectively use the birefringence of the liquid crystal.

The behavior and function of the first diffraction optical element 21 forming the light path switching device 4 are described with reference to FIGS. 5 and 6.

FIG. 5 is a diagram illustrating a structure in which orientation treatment is made such that the orientation is arranged substantially perpendicular to the surface of the substrate and s-polarized light (vertical relative to the direction of the sheet) is incident.

As illustrated in FIG. 5A, when the electric field is not applied and the ordinary beam composition refraction factor $n_o$ of the liquid crystal matches the refraction factor n of the isotropic medium, the beam travels straight without being affected by the grating.

As illustrated in FIG. 5B, when the electric field is applied and the extraordinary beam refraction factor $n_e$ of the liquid crystal does not match the refraction factor n of the isotropic medium, the beam diffracts by affection of the grating.

FIG. 6 is a diagram illustrating an example in which the orientation direction is changed. The orientation is arranged substantially parallel (i.e., ridge line of the grating) to the surface of the substrate and s-polarized light (vertical relative to the direction of the sheet) is incident.

As illustrated in FIG. 6A, when the electric field is not applied and the extraordinary beam composition refraction factor $n_e$ of the liquid crystal does not match the refraction factor n of the isotropic medium, the beam diffracts by affection of the grating.

As illustrated in FIG. 6B, when the electric field is applied and the ordinary beam refraction factor $n_o$ of the liquid crystal does not match the refraction factor n of the isotropic medium, the beam travels straight without being affected by the grating.

The diffraction optical element having the structure described above transmits or diffracts beams depending on the application of an electric field. The diffraction optical element that behaves like this is defined to be the first diffraction optical element 21. As illustrated in FIG. 1, switching the light paths is made possible by a structure having a combination of the first optical element 21 and the second optical element 23.

For the second optical element 23 to re-diffract the beam diffracted by the first diffraction optical element 21 such that the diffracted beam by the second optical element 23 is substantially parallel to the incident light, it is preferred to have the same grating form as of the first diffraction optical element 21 in terms of productivity and manufacturing cost reduction.

With regard to the application of an electric field to the second diffraction optical element 23, whether to apply an electric field depends on the structure. For example, in the case of the structure illustrated in FIG. 7, an electric field is not applied to the second optical element 23. In the case of the structure illustrated in FIG. 8, an electric field is applied thereto.

Figure 8A:
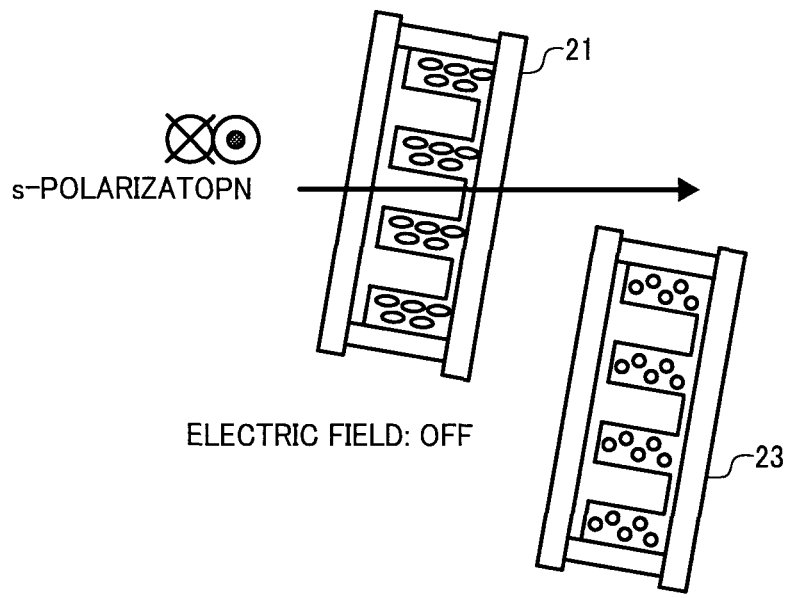
FIG. 8 is a diagram illustrating another combination of the diffraction optical elements in the light path switching device.
Figure 8B:
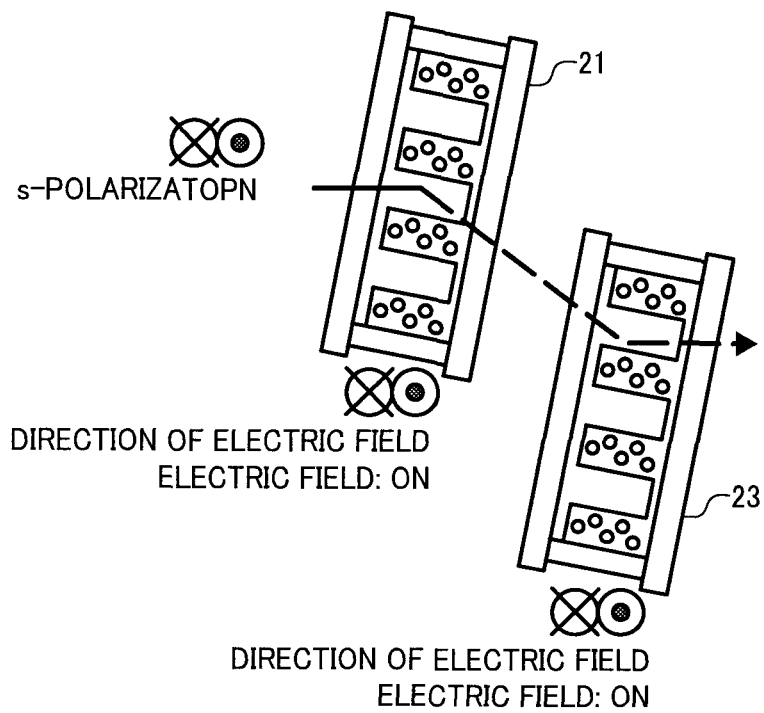

In the case of the structure illustrate in FIG. 8, when an electric field is not applied to the second optical element 23, the diffraction beam from the diffraction optical element 21 is not re-diffracted but transmitted. Therefore, the beam is not incident to the bottom stack polygon mirror 7b.

Figure 9A:
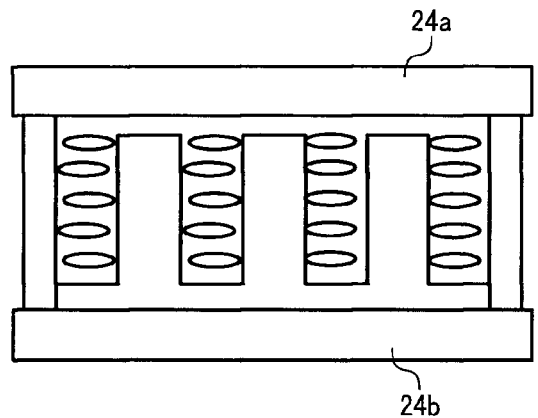
FIGS. 9A and 9B are diagrams illustrating the diffraction optical element having a diffractive function against p-polarization, respectively showing a vertical grating type and a slant grating type.

In FIGS. 5, 6, 7 and 8, the incident deflected beam is s-polarized light. However, when the orientation direction of the liquid crystal is set to be substantially parallel to the surface of the substrate and substantially perpendicular to the ridge line direction of the grating as illustrated in FIG. 9A, the same behavior is possible for the p-polarized light.

With regard to the diffraction function, the diffraction efficiency of + primary light or − primary light is preferably about 100%. As the diffraction optical element, a volume phase type diffraction grating, in which the grating height is thick in comparison with the grating pitch, is preferred.

Figure 7A:
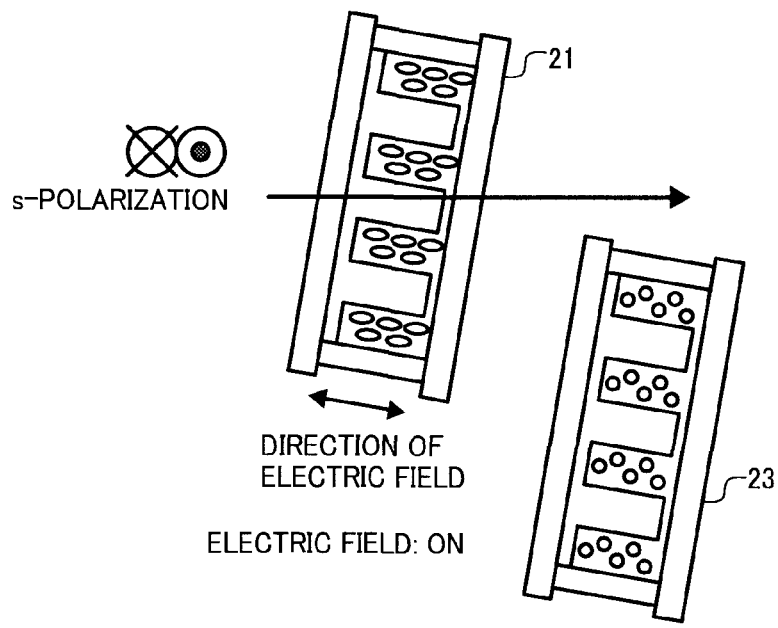
FIG. 7 is a diagram illustrating a combination of the diffraction optical elements in the light path switching device.
Figure 7B:
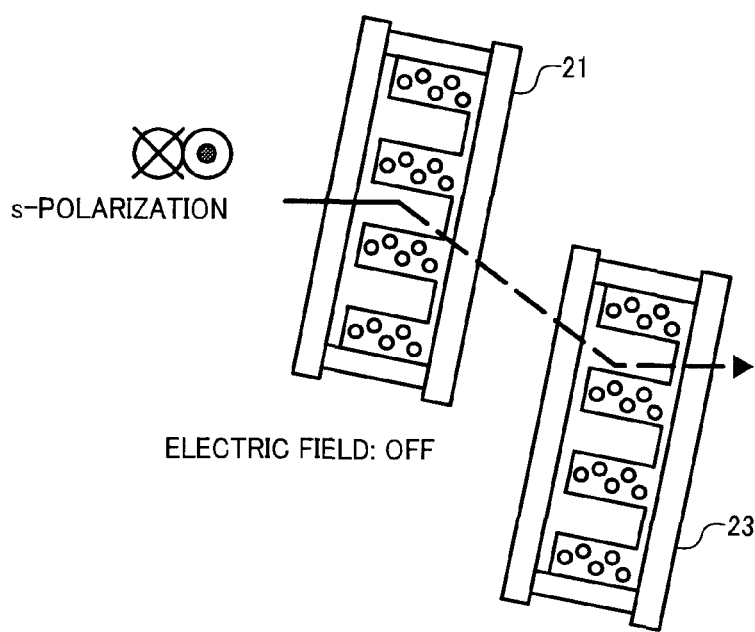
Figure 9B:
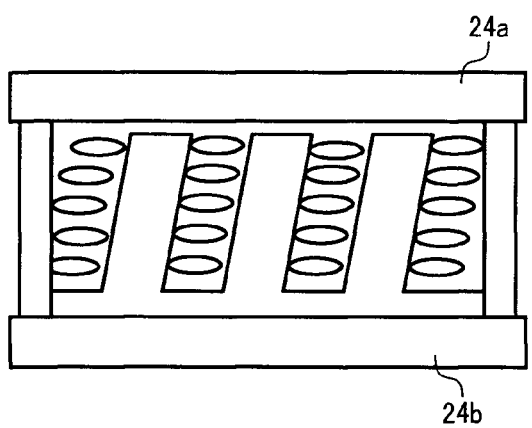

In addition, to improve the efficiency of the diffraction light of the degree of one side, it is preferred to tilt the grating to satisfy the Bragg diffraction condition. With regard to the tilt of grating, the grating form is tilted as illustrated in FIG. 9B or the element is tilted as illustrated in FIGS. 7 and 8.

Next, the manufacturing and behavior of the diffraction optical element forming the light path switching device 4 are described.

SiON is layered on BK7 substrate having a thickness of about 0.5 mm and a grating with a pitch of about 1 μm and a height of about 2.5 μm is formed by photolithography and etching. As illustrated in FIG. 4, a nematic liquid crystal (ZLI-2248, manufactured by Merck Ltd.) is held between a grating forming substrate 24b and a planar substrate 24a.

An orientation film is then spin-coated only on the planar substrate 24a. The gap between the substrates is set to be about 6 μm with a pair of aluminum electrode spacers (supporting member 25) and aluminum electrodes are arranged in the ridge line of the grating such that an electric field is applicable. When a voltage of an electric field intensity of 4.5 V/μm (100 Hz) is applied and a beam of blue LD is incident to this diffraction optical element, a high diffraction efficiency (70%) is obtained at + primary light for the arrangement in which the element (grating) is tilted at an angle of 12°. When the application of the electric field is off in this state, a transmission ratio of 70% is obtained for zero order light.

The polarization direction is set to be in the ridge line of the grating (s-polarized light) and the behavior illustrated in FIG. 5 is confirmed.

Next, a holographic polymer dispersed liquid crystal (HP-DLC) element as the volume phase type diffraction grating forming the light path switching device 4 is described.

Figure 10:
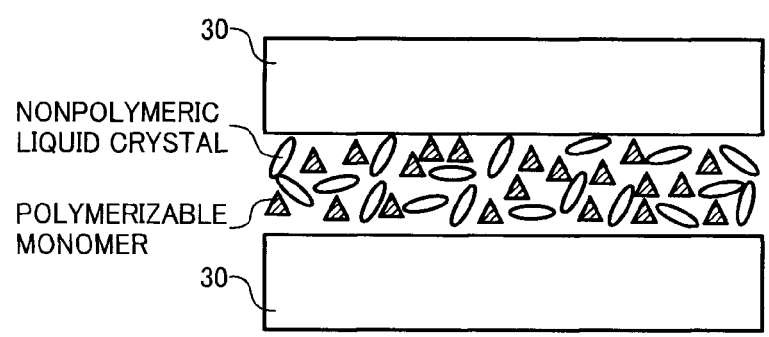
FIG. 10 is a schematic cross section illustrating the structure of the liquid crystal hologram element before interference irradiation.

FIG. 10 is a schematic diagram illustrating a cross section of a liquid crystal hologram element before interference irradiation.

A composition in which non-polymeric liquid crystal molecules, polymerizable monomers or prepolymers, and an optical polymerization initiator are uniformly mixed is sandwiched between the two transparent substrates 30 on which transparent electrodes (not shown) are layered. The thickness of the composition is controlled by a spacer member (not shown) which controls the gap between the substrates.

This composition is photosensitive and thus, in the element manufacturing process, treated in an environment in which light having a wavelength sensitive to the composition is shielded.

With regard to the structure of the liquid crystal hologram element, for example, a spherical spacer, a fiber spacer, PET film or mylar film which is used in a liquid crystal display can be used as the space member. In addition, protrusion forms including concavoconvex forms can be processed on the surface of the substrate by photolithography and etching or molding technology.

The spacer member can be placed in the hologram area. However, considering adverse impacts such as light scattering, it is preferred to set the spacer member outside the effective area of the hologram. The range of the height of the space member is from several μm to several tens μm. It is suitable to determine the thickness of the hologram according to the wavelength of the diffraction light and the difference between the refraction indices of the polymer portion and the liquid crystal portion.

With regard to the transparent substrate, it is possible to use glass substrates, plastic substrates, etc., for use in the liquid crystal display.

With regard to the composition, typical liquid crystal can be used as the non-polymeric liquid crystal as long as the liquid crystal has a refraction factor anisotropic aspect. Upon selection of liquid crystal material, it is possible to select a liquid crystal material having a significantly same refraction factor as that of the cured layer of the polymerizable monomer or prepolymer in the orientation state of an order parameter. Also, it is suitable to select a crystal liquid material first and then select a polymerizable monomer or a prepolymer having a significantly same refraction factor as that of the liquid crystal in the orientation state of an order parameter.

As the polymerizable monomer or the prepolymer, it is preferred to select one which has great curing contraction by the polymerization. Furthermore, a thermal polymerization inhibitor and/or a plasticizer can be added in addition.

As the optical polymerization initiator, known materials can be used. The addition thereof is dependent on the absorbance of irradiation light of each material for the wavelength thereof and preferably from 0.1 to 10% by weight and more preferably from 0.5 to 3% by weight based on the total amount of the monomer or the monomer or the prepolymer.

When the addition amount of an optical polymerization initiator it excessively small, the phase separation between the polymer and the liquid crystal tends to hardly occur, resulting in elongation of exposure. To the contrary, when the addition amount of an optical polymerization initiator is excessively large, the polymer and the liquid crystal tend to be cured while the phase separation therebetween is insufficient. Therefore, a great number of liquid crystal molecules are taken in the polymer, which leads to a problem that polarization selectability worsens.

Similarly, the mixing ratio of the non-polymerizable liquid crystal material and the polymerizable monomer or prepolymer has a great impact on the phase separation. When the mixing ratio of the non-polymerizable liquid crystal is too small, a sufficient birefringence (refraction factor modulation amount) is not obtained. When the mixing ratio of the non-polymerizable liquid crystal is too large, a great number of liquid crystal molecules are taken in the polymer, which leads to a problem that polarization selectability worsens.

In addition, the liquid crystal molecules in the polymer become droplets, which causes scattering and thus the transmission ratio decreases. With regard to the mixing ratio, the amount of the non-polymerizable liquid crystal material is preferably from 10 to 30% by weight and more preferably from 20 to 25% by weight based on the total amount of 100% by weight of the polymerizable monomer or prepolymer. In this mixing range, the birefringence and the scattering composition of the liquid crystal are balanced, resulting in high transmission ratio.

Figure 11:
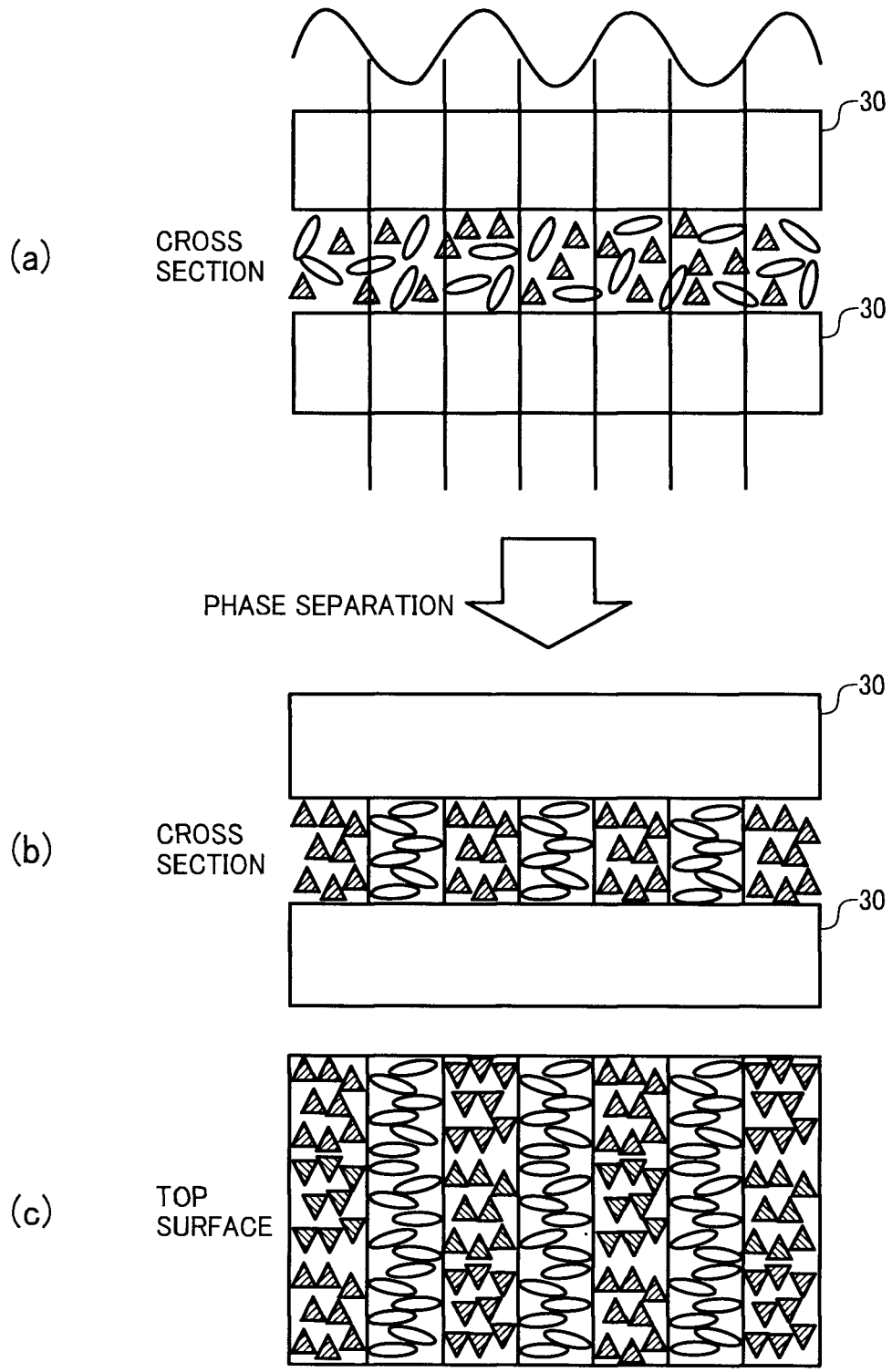
FIG. 11 is a diagram illustrating a hologram formation process by phase separation of the liquid crystal element.

The process of forming the hologram by the phase separation is described with reference to FIG. 11. As illustrate in FIG. 11A, when the composition is exposed to light using double beam of light interference irradiation light by a suitable laser light source (not shown), the optical polymerization reaction of the polymerizable monomer or prepolymer starts in the light portion of the interference fringe.

At this time, curing contraction occurs, which invites the density difference. The adjacent polymerizable monomer or prepolymer move to the light portion to advance the polymerization. At the same time, non-polymerizable liquid crystal is moved out to the dark portion, resulting in phase separation (refer to FIG. 11B). At this point, a force which makes the major axis of the liquid crystal molecule align in the moving direction is considered to act according to the mutual action between the liquid crystal molecule and the monomer and the polymer chain when the liquid crystal moves.

That is, in the phase separation process, a force which makes the liquid crystal molecule align in the pitch direction of the interference fringe is considered to act. Finally, a periodical structure of the polymer layers and the non-polymeric crystal layers corresponding to the pitch of light and dark portions of the interference fringe is formed as illustrated in FIG. 11C. Therefore, the state is considered to be obtained in which the orientation vector of the liquid crystal portion is aligned to the pitch direction of the interference fringe.

In the interference irradiation and phase separation processes, it is preferred to heat the material to a suitable temperature and maintain the temperature. The speed of the phase separation varies depending on the temperature, which affects the orientation property of the liquid crystal molecules. Although the most suitable temperature depends on the materials to be used, it is preferred to maintain the temperature thereof in the range of from about 40° C. to about 100° C.

With regard to the periodical structure of the polymer layer and the non-polymeric liquid crystal layer, it is difficult to completely separate the polymer layer and the non-polymeric liquid crystal periodically. The polymer layer in this context represents an area in which polymer compositions occupy a large amount with a small or no liquid crystal molecules. Actually, it is inferred that the interface between the polymer layer and the liquid crystal layer is not to be ideally smooth but concavoconvex. As illustrated in FIG. 11, the variation in the major axis direction of the liquid crystal at the interface is large and the order parameter in the liquid crystal layer is slightly small.

The pitch of the periodical structure to be manufactured varies according to a desired diffraction angle and the wavelength and is in the range of from about 0.2 μm to about 10 μm. For example, to obtain a diffraction angle of 40° against the incident light of 650 nm, a preferred pitch is about 1.0 μm and, the incident light of 780 nm, about 1.2 μm, The angle of tilt is preferably from −20° to +20° when the vertical direction relative to the surface of the substrate is defined to be 0°. The amount of irradiation depends on the addition density of an optical polymerization initiator and the temperature during irradiation and is preferably from 0.5 to 30 J/cm$^2$ in which the amount of refraction factor modulation is stably saturated and more preferably from 1 to 15 J/cm$^2$ in which stable productivity is further obtained.

The liquid crystal hologram element manufactured by the interference irradiation can be manufactured at low cost because the liquid crystal hologram element can be copied from the original plate thereof. In addition, due to the relation to the orientation regulation by a polymer, the liquid crystal is relatively in good response to the electric field driving in comparison with the diffraction optical element in which liquid crystal is filled in a grating form.

Next, the way the liquid crystal hologram element forming the light path switching device 4 is manufactured and the behavior thereof are described below.

On one side of a glass substrate having a thickness of 0.7 mm, a reflection prevention layer is formed against blue light and red light and an ITO (Indium-Tin Oxide) electrode is formed on the opposite side to the reflection prevention layer. An adhesive in which beads spacers having a diameter of about 8 μm is mixed is attached to each of the glass substrate and the glass substrates are attached to each other with the electrode facing each other.

The adhesive is attached to the opposite side to the reflection prevention layer and applied to two places on the fringe of the substrate.

The mixture composition including the following materials (1) to (5) is filled in a cell by a capillary method while heated to about 65° C. and a composition layer having a thickness of about 8 μm is formed. The composition is treated in a dark room in which red light is used since the composition is responsive to light having a wavelength shorter than that of green light.

| | | |
|---|---|---|
| (1) | Nematic liquid crystal (TL216, Δε > 0, manufactured by Merck Ltd.) | 25 parts |
| (2) | Phenyl glycidyl ether acrylate hexamethylene diisocyanate urethane polymer (AH600, manufactured by Kyoeisha Chemical Co., Ltd.) | 75 parts |

-continued

| | |
|---|---|
| (3) Dimethylol tricyclodecane diacrylate (DCP-A, manufactured by Kyoeisha Chemical Co., Ltd.) | 10 parts |
| (4) 2-hydroxyethyl methacrylate (HO, manufactured by Kyoeisha Chemical Co., Ltd.) | 5 parts |
| (5) Bisacylphosphine oxide based optical polymerization initiator (IRGACURE 819, manufactured by Ciba-Geigy K.K) | 1 part |

After filling the mixture in the cell, the composition has an isotropic property in a room temperature environment.

Next, double beam of light interference irradiation system using He—Cd laser having a wavelength of 442 nm with a power of 80 mW. Laser beam is divided and enlarged and one beam of light is parallel light about 10 mW/cm$^2$ and the intersection angle of the two beams of light is set to be 28°. With this wavelength and the intersection angle, an interference fringe is formed in the intersection area of the two beams of light with a periodic cycle of about 1 µm.

A cell substrate is attached to a heating device and double beam of light interference irradiation is conducted for one minute while heated to and maintained at about 65° C. to manufacture a liquid crystal hologram element. The two beams of light are set to be incident from an angle of +7° and +35° relative to the vertical direction to the surface of the substrate.

As the characteristic evaluation of the liquid crystal hologram element, the manufactured element is irradiated with a linear polarized laser beam having a wavelength of 633 nm and the intensity of the zero order light and the +primary light against the intensity of the incident light is measured. An ND filter is used such that the intensity of the incident light is about 5 mW. A linear polarization plate and a half wavelength plate are arranged in the incident light path. The polarization direction (P-polarization light and s-polarization light) incident into the element is switchable by rotating the optical axis of the half wavelength plate at an angle of 45°.

The p-polarization is perpendicular to the interference fringe formed during interference irradiation and s-polarization is along the direction of the interference fringe. When the incident polarization direction is fixed to p-polarization direction, a high diffraction efficiency (80% at +primary light and 8% transmission ratio at the zero order light) is obtained. When the incident polarization direction is fixed to be p-polarization direction and a voltage having an electric field intensity of 40 V/µm (100 Hz) is applied to between the substrates, the diffraction efficiency for the + primary light is about 0% and a high transmission ratio (88%) for the zero order light is obtained.

When the response speed at this point is measured by a high speed camera, the speed is about 100 µsec when an electric field is applied and, 250 µsec when an electric field is not applied. This response speed is by two orders of magnitude higher than that of a typical liquid crystal element.

By using this liquid crystal hologram element as the first diffraction optical element 21, the light path can be switched by controlling the application of an electric field.

In this embodiment, the light path switching device 4 is structured of the two independent members, i.e., the first diffraction optical element 21 and the second diffraction optical element 23. It is also possible to have a structure of a single optical element having these functions.

In addition, the application of acting force which actively drives a liquid crystal element (diffraction optical element) is not limited to the application of an electric field. For example, magnetic field can be also applied as an acting force.

Furthermore, the image bearing member is polarization-scanned (scanned in the primary scanning direction) by the two polygon mirrors located in the sub-scanning direction. It is also possible to have a structure of a single stack polygon mirror which uses the top and the bottom portions of the single-face mirror as the polarization positions. Furthermore, in the case of a single face mirror, different scanning surfaces are scanned by a slanted incident system using the same polarization positions. This is true to the other embodiments described below.

The second embodiment is described with reference to FIGS. 12 to 16.

Figure 12:
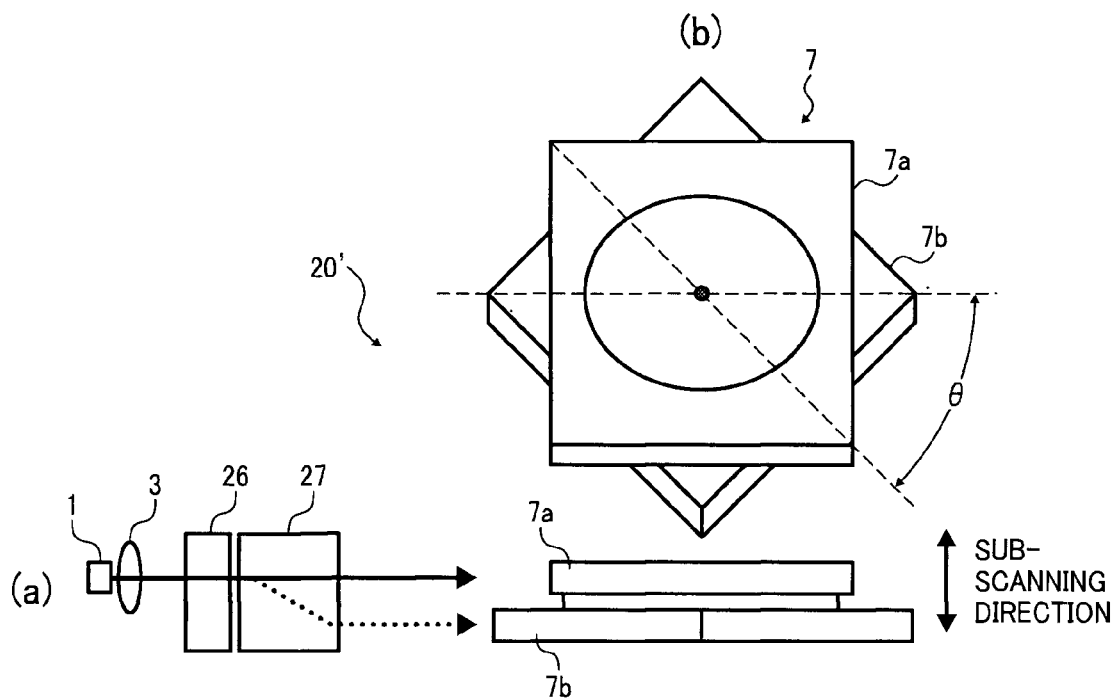
FIG. 12 is a schematic diagram illustrating a main part of the optical scanning device related to the second embodiment described later.

FIG. 12 is a diagram illustrating a part of the optical scanning device related to the second embodiment. The optical scanning device 20' includes a laser light source 1, a polarization switching device 26, a polarization separation device 27, a multi-stacked and multi-faced reflection mirror 7 which shares an axis, etc. In FIG. 12, a cylindrical lens and an image focus optical system for scanned surfaces are omitted as in the conventional example for comparison.

In this embodiment, a combination of the polarization switching device 26 and the polarization separation device 27 has the function of the light path switching device 4 in the first embodiment.

The polarization switching device 26 has a function of switching p-polarization and s-polarization and the polarization separation device 27 functions as a diffraction element to select a light path by separating the p-polarization and s-polarization.

As the polarization separation device 27, a combinational structure which has a polarization beam splitter (PBS) prism, the diffraction optical element 21 and the diffraction optical element 23 described above can be used. Especially, a structure in which a diffraction optical element is combined as illustrated in FIG. 13 is advantageous to cost reduction.

Figure 13:
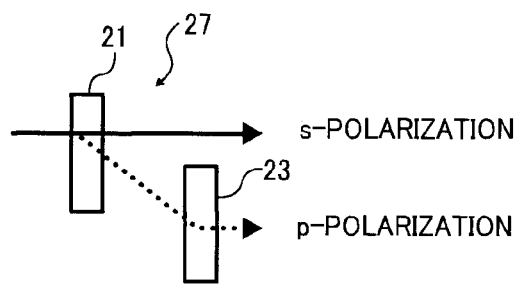
FIG. 13 is a schematic diagram illustrating the structure and the function of the polarization separation device of the optical scanning device.

The structure illustrated in FIG. 13 uses a diffraction optical element having a function of transmitting s-polarized light and diffracting p-polarized light. There is no limit to the diffraction optical element as long as the element has a function of separating orthogonal polarization compositions by transmission and diffraction.

The way the polarization separation element (polarization separation device 27) in which diffraction optical elements are combined and the behavior thereof are described below.

On one side of a glass substrate having a thickness of 0.7 mm, a reflection prevention layer is formed against blue light and red light. An adhesive in which beads spacers having a diameter of about 8 µm is mixed is attached to each of the glass substrate and the glass substrates are attached to each other. The adhesive is attached to the opposite side to the reflection prevention layer and applied to two places on the fringe of the substrate.

The mixture composition including the following materials (1) to (5) is filled in a cell by a capillary method while heated to about 65° C. and a composition layer having a thickness of about 8 µm is formed. The composition is treated in a dark room in which red light is used since the composition is responsive to light having a wavelength shorter than that of green light.

| | |
|---|---|
| (6) Nematic liquid crystal (TL216, Δε > 0, manufactured by Merck Ltd.) | 25 parts |
| (7) Phenyl glycidyl ether acrylate hexamethylene diisocyanate urethane polymer (AH600, manufactured by Kyoeisha Chemical Co., Ltd.) | 75 parts |

-continued

| | | |
|---|---|---|
| (8) | Dimethylol tricyclodecane diacrylate (DCP-A, manufactured by Kyoeisha Chemical Co., Ltd.) | 10 parts |
| (9) | 2-hydroxyethyl methacrylate (HO, manufactured by Kyoeisha Chemical Co., Ltd.) | 5 parts |
| (10) | Bisacylphosphine oxide based optical polymerization initiator (IRGACURE 819, manufactured by Ciba-Geigy K.K) | 1 part |

After filling the mixture in the cell, the composition has an isotropic property in a room temperature environment.

Next, double beam of light interference irradiation system using He—Cd laser having a wavelength of 442 nm with a power of 80 mW. Laser beam is divided and enlarged and one beam of light is parallel light about 10 mW/cm$^2$ and the intersection angle of the two beams of light is set to be 28°. With this wavelength and the intersection angle, an interference fringe is formed in the intersection area of the two beams of light with a periodic cycle of about 1 μm.

A cell substrate is attached to a heating device and double beam of light interference irradiation is conducted while heated to about 65° C. to manufacture a liquid crystal hologram element. The two beams of light are set to be incident from an angle of +7° and +35° relative to the vertical direction to the surface of the substrate.

As the characteristic evaluation of the liquid crystal hologram element, the manufactured element is irradiated with a linear polarization having a wavelength of 633 nm and the intensity of the zero order light and the +primary light against the intensity of the incident light is measured. An ND filter is used such that the intensity of the incident light is about 5 mW. A linear polarization plate and a half wavelength plate are arranged in the incident light path. The polarization direction (P-polarized light and s-polarized light) incident into the element is switchable by rotating the optical axis of the half wavelength plate at an angle of 45°.

The p-polarization is perpendicular to the interference fringe formed during interference irradiation and s-polarization is along the interference fringe. When the incident polarization direction is set to be p-polarization, a high diffraction efficiency (89% at +primary light and 9% transmission ratio at the zero order light) is obtained. When the incident polarization direction is set to be s-polarization, a high transmission ratio (98% at the zero order light and 0% diffraction efficiency at +primary light) is obtained.

A polarization separation element is manufactured as illustrated in FIG. 13 using two of the liquid crystal hologram elements described above. The gap between the two elements is set be about 10 mm. The light use efficiency for the polarization direction is measured when p-polarized light and s-polarized light are incident. The light use efficiency for p-polarized incident light is 78% and the light use efficiency for s-polarized incident light is 94%, resulting in good polarization separation.

The polarization switching device 26 can be of a structure in which an electric field application device is provided with a material having a property that a refraction factor varies upon application of an electric field. For example, there is a structure of a ferroelectric substance crystal such as LN or a structure of a liquid crystal element. The ferroelectric substance is manufactured by cutting out and device-processing a crystal substrate and thus is disadvantageous in terms of size reduction and high density, resulting in expensive cost. The liquid crystal element is widely used for display and thus is inexpensive. Twist nematic liquid crystal, a typical liquid crystal element, is not suitable for a high speed response since the response speed is several tens of ms.

Therefore, it is preferred to use a ferroelectric liquid crystal available at a relatively inexpensive cost and having a high response speed as a polarization switching element.

In the optical scanning device, the polarization direction of the beam emitted from the laser light source is switched by the electric field control in the polarization switching device 26. The light path (top stack and the bottom stack) of each beam in the polarization direction bisecting at a right angle by the polarization separation device 27 is shifted in parallel in the sub-scanning direction. Each beam is incident into the polygon mirrors 7a and 7b provided in the top and the bottom stack based on a time splitting method. The polygon mirrors 7a and 7b are structured of four faceted polygon mirrors with a phase of 45° apart in the same manner as in the conventional example for comparison.

In such a structure, by controlling an electric field in the polarization switching device 26, when the beam from the top stack polygon mirror 7a scans the surface of an image bearing member, the beam substantially passes the top stack light path and hardly passes the bottom stack light path as illustrated in FIG. 3.

Furthermore, when the beam from the bottom stack polygon mirror 7b scans the surface of an image bearing member, the beam substantially passes the bottom stack light path and hardly passes the top stack light path. Therefore, the beam from the light source can be efficiently used without a loss. This leads to elongation of a light source and reduction of the probability of deterioration. This effect is significant especially when a surface emitting laser, which is effective for increasing density, is used as a light source.

Next, the polarization switching device 26 is described.

Figure 14:
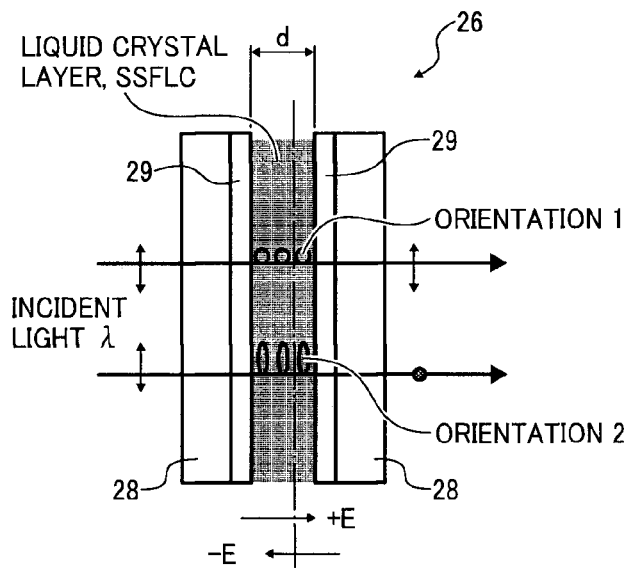
FIG. 14 is a schematic diagram illustrating a cross section of the polarization switching device using the liquid crystal element.

FIG. 14 is a schematic diagram illustrating the polarization switching device 26 using a liquid crystal element. The polarization switching device 26 includes a pair of transparent substrates 28, an orientation film (not shown), a ferroelectric liquid crystal layer formed of chiral smectic C phase having a homogeneous orientation, a pair of transparent electrodes 29 which apply an electric field in a substantially right direction relative to the transparent substrates 28, and an electric field application device (not shown) as an acting force application device.

As described above, it is preferred to use a ferroelectric liquid crystal formed of chiral smectic C phase having a homogeneous orientation for a high speed response. It is also nematic liquid crystal for a structure which is not necessary to perform at a high speed response.

In addition, as to the orientation film, typical layers such as polyimide for use in TN crystal liquid or STN liquid crystal can be used. Furthermore, it is also possible to utilize an inorganic orientation film having a high durability such as SiO, SiO$_2$ or polysiloxane based layer. To strongly control in the liquid crystal director direction, such a layer is preferably subject to rubbing treatment or optical orientation treatment. It is possible to use ITO, etc. as the transparent electrode 29.

Figure 15:
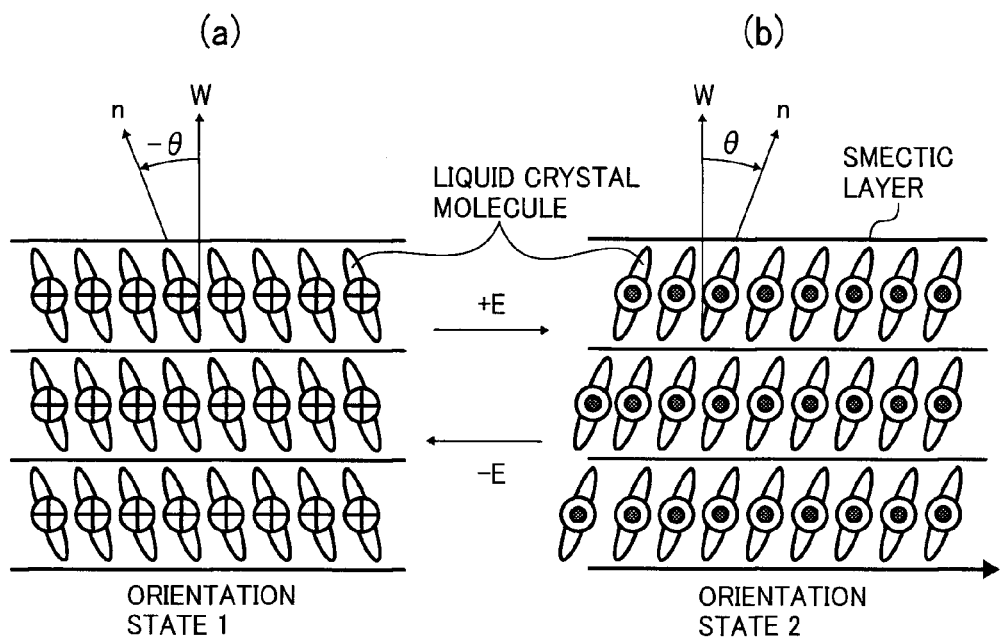
FIG. 15 is a schematic diagram illustrating switching of a ferroelectric liquid crystal.

FIG. 15 is a diagram illustrating a switching of a ferroelectric liquid crystal. In general, a ferroelectric liquid crystal layer formed of chiral smectic C phase has a spiral structure. When the ferroelectric liquid crystal layer is sandwiched in the cell gap d, which is narrower than a pitch of the spiral, the spiral structure is loosened, which results in formation of the surface stabilized ferroelectric liquid crystal (SSFLC) layer.

SSFLC achieves a mixture orientation state in which liquid crystal molecules are stabilized with a tilt angle of −θ (θ=22.5° C. in this case) relative to a normal line of the smectic layer as illustrated in FIG. 15A, and in which liquid crystal molecules are stabilized with a tilt angle of θ as illustrated in FIG. 15B.

In FIG. 15, W represents the normal line of the smectic layer, n represents the major axis direction (director) of liquid crystal molecules, a symbol in which a black portion is circled and a symbol in which + is circled represent the direction of intrinsic polarization.

By applying an electric field in the vertical direction relative to the sheet, it is possible to uniformly align and maintain the direction of liquid crystal molecules and the intrinsic polarization thereof. By switching the polarization of the electric field, the two orientation states can be switched.

That is, in FIG. 15, when an electric field of −E is applied, the orientation is stabilized at the orientation state 1 in which the liquid crystal molecule is tilted at an angle of −θ relative to a normal line direction W of the smectic phase. When an electric field of E is applied, the orientation is stabilized at the orientation state 2 in which the liquid crystal molecule is tilted at an angle of θ relative to the normal line direction W of the smectic phase.

When θ is 22.5°, it is possible to be stabilized at the orientation state 2 which is tilted at an angle of 45° from the orientation state 1.

Figure 16A:
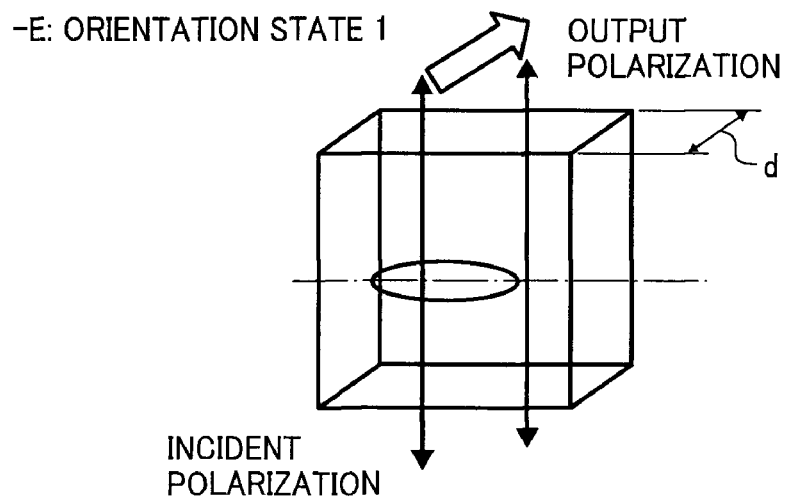
FIG. 16 is a schematic diagram illustrating the behavior of the polarization switching device using a surface stabilized ferroelectric liquid crystal layer.
Figure 16B:
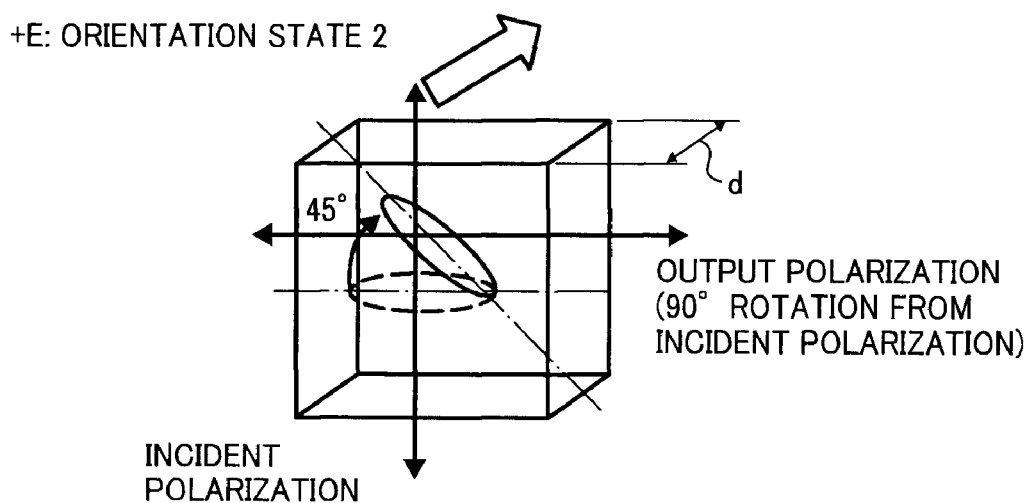

FIG. 16 is a schematic diagram illustrating a behavior of the polarization switching element using the SSFLC described above.

In FIG. 16, the thickness (cell gap) d of the liquid crystal layer is determined by a wavelength λ (e.g., 650 nm or 780 nm) of incident light and a refraction factor anisotropy Δn of the liquid crystal at 650 nm or 780 nm. The thickness d is determined to satisfy the relationship: $\Delta n \times d = \lambda/2$, that is, to satisfy the half wavelength plate condition.

The incident polarization direction is preferably arranged to match the minor axis direction or the major axis direction of the liquid crystal molecule in one of the two orientation states 1 and 2 of the liquid crystal molecule orientation in the liquid crystal layer.

In this case, the orientation state 1 in which −E is applied is defined as the minor axis. The polarization direction of the incident polarization is adjusted by the location of the phase plate. It is also possible to set the initial orientation of the liquid crystal molecule by the orientation treatment such as rubbing or rotate the liquid crystal element itself.

In this structure, as illustrated in FIG. 16, when an electric field of −E is applied between the transparent electrodes 29, the liquid crystal molecules are tilted to be in the orientation state (orientation state 1) in which the liquid crystal molecules are tilted with an angle of −θ relative to the normal line direction W of the smectic phase. The incident polarized light is output with the polarization direction maintained.

On the other hand, when an electric field of +E is applied, the liquid crystal molecules are oriented in the state (orientation state 2) in which the liquid crystal molecules are tilted with an angle of θ relative to the normal line direction W of the smectic phase. In this case, θ is 22.5° and therefore, the major axis direction (director) of the liquid crystal molecule is oriented with an angle of 2θ (=45°) based on the incident light. Consequently, the half wavelength plate condition is satisfied and the output polarized light is substantially 90° rotated relative to the incident light.

That is, polarization is switched by the control of an electric field. In addition, since the ferroelectric liquid crystal is used, the response speed for switching polarization is high (from several μsec to several hundreds of μm).

Ellipsometry of the liquid crystal element having a structure illustrated in FIG. 16 is verified by Simulation 1 using LCD master (manufactured by Shintec Inc.).

To analyze the polarization state in the ideal model with regard to the orientation state, the prerequisites are that the liquid crystal is nematic (ZLI-2293, manufactured by Merck Inc.), the application voltage is 0 V and the pre-tilt angle is 0°. The details of this Simulation 1 are shown in Tables 1 and 2.

Simulation 1
Calculation algorithm: 2×2 matrix
Atmosphere environment (refraction factor=1)
Transmission type
Incident light
Light source lamp: D65
Incident polarization direction: 0° (p-polarization)

TABLE 1

(Structure)

| Structure | Thickness (nm) |
|---|---|
| Glass 1737 | 7.000e+005 |
| Liquid crystal cell | Refer to #1 in Table 2 |
| Glass 1737 | 7.000e+005 |

Detail About Liquid Crystal
Liquid crystal material: ZLI-2293 (manufactured by Merck Inc.)
Birefringence: $\Delta n$=(extraordinary light refraction factor $n_e$−ordinary light refraction factor $n_o$): 0.130 (=1.626−1.496)
Wavelength: 650 m

TABLE 2

| | Model 1 #1 | Model 2 #2 | Memo |
|---|---|---|---|
| Material | ZLI-2293 | ZLI-2293 | |
| Type | nematic | nematic | |
| Application voltage | 0.000 V | 0.000 V | |
| Cell gap d | 2.50 μm | 2.50 μm | |
| Chirality | 0.000 (rad/m) | 0.000 (rad/m) | |
| Pre-tilt angle | 0.0 deg. | 0.0 deg. | Light source side (light incident side) |
| | 0.0 deg. | 0.0 deg. | Observation side (light output side) |
| Torsion angle (Direction of liquid crystal molecule) | 0.0 deg. | 45.0 deg. | Light source side (light incident side) |
| | 0.0 deg. | 45.0 deg. | Observation side (light output side) |
| | ↓ | ↓ | |
| P-polarization transmission ratio (Ep^2/S0) | 100% | 100% | Direction of light incident (wavelength: 650 nm) Angle of direction: 0 deg. Angle of tilt: 0 deg. |
| s-polarization transmission ratio (Es^2/S0) | 0% | 100% | Direction of light incident (wavelength: 650 nm) Angle of direction: 0 deg. Angle of tilt: 0 deg. |

Ep: the size of the space composition of the electric field Ep of transmission light
Es: the size of the space composition of the electric field Es of transmission light
S0: Stalks parameter The incident polarization direction in Simulation 1 is 0° (p-polarization) and the direction of the liquid crystal molecule in Model 1 is the same as that of p-polarization, i.e., 0°. Since the light is not sensitive to birefringence of the liquid crystal, the transmission ratio of p-polarization is 100% and the transmission ratio of s-polarization is 0%.

The direction of the liquid crystal molecule in Model 2 is tilted at an angle of 45 relative to p-polarization. Since the light is sensitive to birefringence and the relationship: birefringence: $\Delta n \times d = \lambda/2$ is satisfied, 90° polarization occurs.

In Simulation 1, $\lambda$ is 650 nm, birefringence: $\Delta n$ is 0.130, the cell gap d is 2.50 μm. Therefore, the relationship is satisfied and as the result of 90° polarization rotation, the transmission ratio of p-polarization is 0% and the transmission ratio of s-polarization is 100%. In the ideal model, 90° polarization rotation function is confirmed.

For reference, when the wavelength is 780 nm, since the liquid crystal has wavelength dispersion, slightly the birefringence thereof is small. When $\Delta n$ is 0.125, the cell gap d (which has a 90° polarization rotation function) is 3.1 μm.

Next, the way the polarization switching device 26 using a ferroelectric liquid crystal element is manufactured and the behavior thereof are described. An ITO electrode layer having a thickness of 1,500 Å is formed on a non-alkali glass substrate having a thickness of 1.1 mm. An orientation film (AL3046-R31, manufactured by JSR Corporation) having a thickness of about 800 Å is formed on the substrate electrode side by a spin-coating method. The surface of the substrate is subject to orientation treatment by a rubbing method. Two of the glass substrates described above are attached to each other with the electrode sides facing each other by an adhesive in which beads are mixed such that the gap between the substrates is about 2.5 μm. A ferroelectric liquid crystal (RS002, $\Delta n$=0.17, 2θ=90°, manufactured by Clariant) functioning as a liquid crystal layer is filled between the two substrates by a capillary method while the substrates are heated to 90°. A direct current of 10 V/μm is applied in the range of from 70° C. to 55° C. while cooled down followed by sealing. Thus, a liquid crystal element as illustrated in FIG. 14 is manufactured. When the orientation state is observed by an optical microscope, a substantially uniform orientation state is confirmed. A square wave signal of a frequency of 100 Hz and from 90 to 110 V/μm is input to the liquid crystal element to measure the light and dark switching speed under Cross Nicole by a liquid crystal element evaluation device (manufactured by Otsuka Electronics Co., Ltd.).

Figure 17:
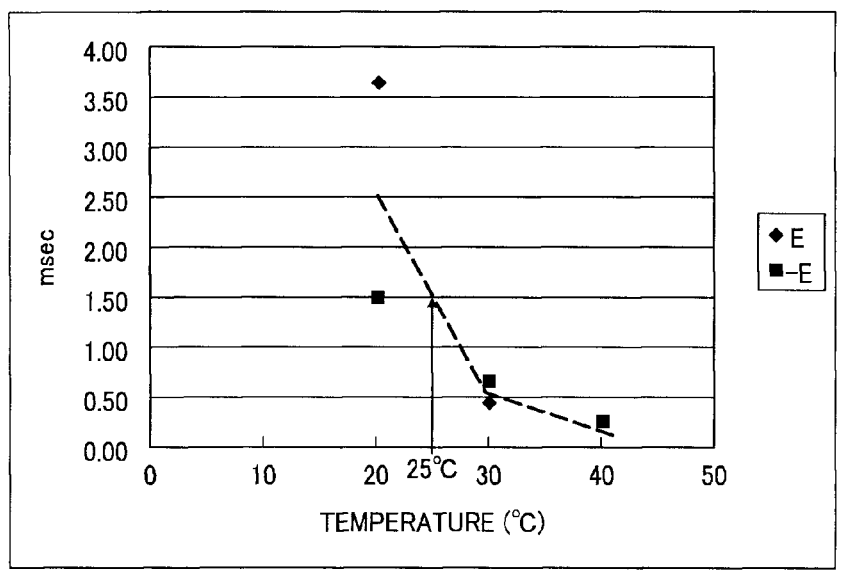
FIG. 17 is a graph illustrating the response speed characteristics of the liquid crystal element.

FIG. 17 is a diagram illustrating the response speed characteristics. The response speed is the output saturation value from + or − voltage switching timing and data of light and dark of 10 to 90% of transmission light. The response speed around room temperature (25° C.) is about 1 msec. This response is an order of magnitude higher than that of a typical liquid crystal.

With regard to the behavior of polarization switching by electric field control, a cone angle 2θ of the ferroelectric liquid crystal is preferably 45° as illustrated in FIG. 16 to efficiently conduct polarization switching. Therefore, the liquid crystal is manufactured and evaluated as described above using a ferroelectric liquid crystal (FELIX018-100, manufactured by Clariant) having $\Delta n$ of 0.17 and 2θ of 45°.

The manufactured liquid element is placed between the $\lambda/2$ plate and the polarization plate and the polarization directions of incident light and output light are evaluated. A red LD having a wavelength of 650 nm is used as the light source.

The incident polarization direction at the $\lambda/2$ plate is set to have a tilt angle of substantially 22.5° relative to the rubbing direction. Next, an electric field of +10 V/μm is applied between the element electrodes. The polarization directions of the incident and output light are substantially the same although the polarization is slightly elliptic.

Furthermore, when an electric field of −10 V/μm is applied between the element electrodes, the polarization directions of the incident and output light are substantially 90° apart although the polarization is slightly elliptic. That is, the polarization is switched 90° by controlling the application of an electric field. The reason why the output polarization is elliptic is that the condition: $\Delta n \times d = \lambda/2$ is not optimized.

Furthermore, signals of square waves of a frequency of 4 kHz and + or − of 18 V/μm and pulse waves (pulse width: 40 μsec) are input to the liquid crystal element and the switching speed is measured with regard to the light and dark switching speed under Cross Nicole. The switching response speed is obtained from the photodiode output waveform using an oscilloscope. The response speed is from + or − voltage switching timing to the output saturation value and data are of light and dark from 1 to 100% of transmission light.

Figure 18:
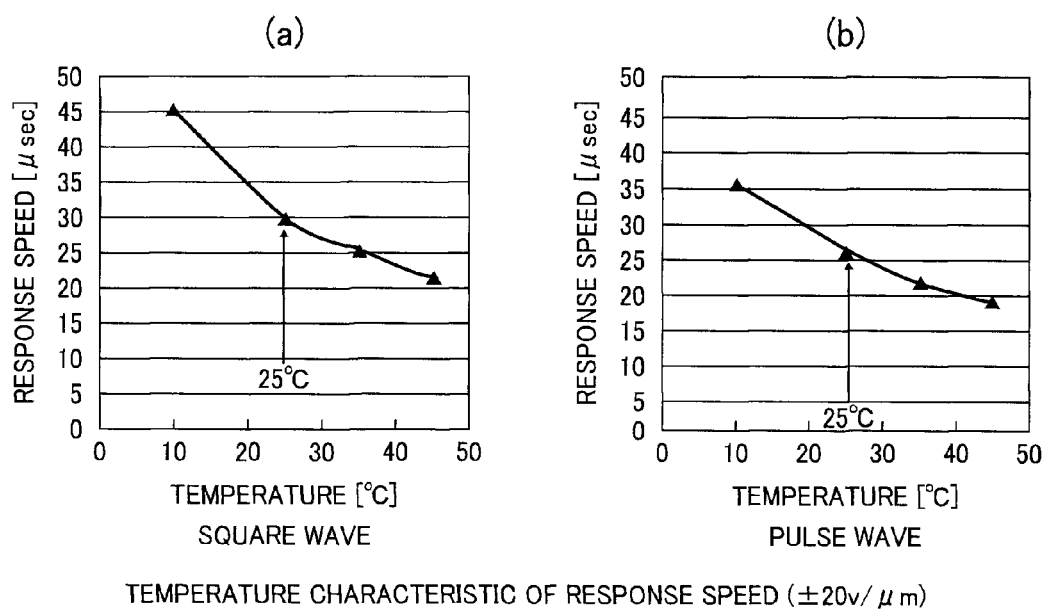
FIG. 18 is a graph illustrating the relationship between the temperature and the response speed.

FIG. 18 is a diagram illustrating the response speed characteristics of the liquid crystal element. Since the response speed when + or − electric field is applied is almost the same, the averages when + or − electric field is applied are plotted. The response speed around room temperature (25° C.) is about from 25 to 30 μsec. The response speed is improved by two orders of magnitude higher than the ferroelectric liquid crystal element described above.

The third embodiment (a variation of polarization switching device: parallel structure) is described with reference to FIGS. 19 to 25.

FIG. 19 is a schematic diagram illustrating a polarization switching device 31 in which multiple liquid crystal elements having the same structure as that of the polarization switching device 26 illustrated in FIG. 14 are arranged in parallel in the optical axis direction. In this case, an example of two multiple liquid crystal elements is illustrated.

Each liquid crystal element 32 has a structure including a pair of transparent substrates 28, an orientation film (not shown), a ferroelectric liquid crystal layer formed of chiral smectic C phase having a homogeneous orientation, a pair of transparent electrodes 29 which apply an electric field in a substantially vertical direction relative to the surface of the transparent substrate 28, and a common electric field application device 33.

As in the description about the second embodiment, it is preferred to use a ferroelectric liquid crystal formed of chiral smectic C phase having a homogeneous orientation for a high speed response. In addition, as to the orientation film, typical layers such as polyimide for use in TN crystal liquid or STN liquid crystal can be used. Furthermore, it is also possible to utilize an inorganic orientation film having a high durability such as SiO, SiO2 or polysiloxane based layer. To regulate the direction of the liquid crystal director, it is preferred to conduct rubbing treatment or optical orientation treatment in a separate occasion.

It is possible to use ITO, etc. as the transparent electrode 29. Switching (refer to FIG. 15) of the ferroelectric liquid crystal is the same as that described in the second embodiment.

Figure 20A:
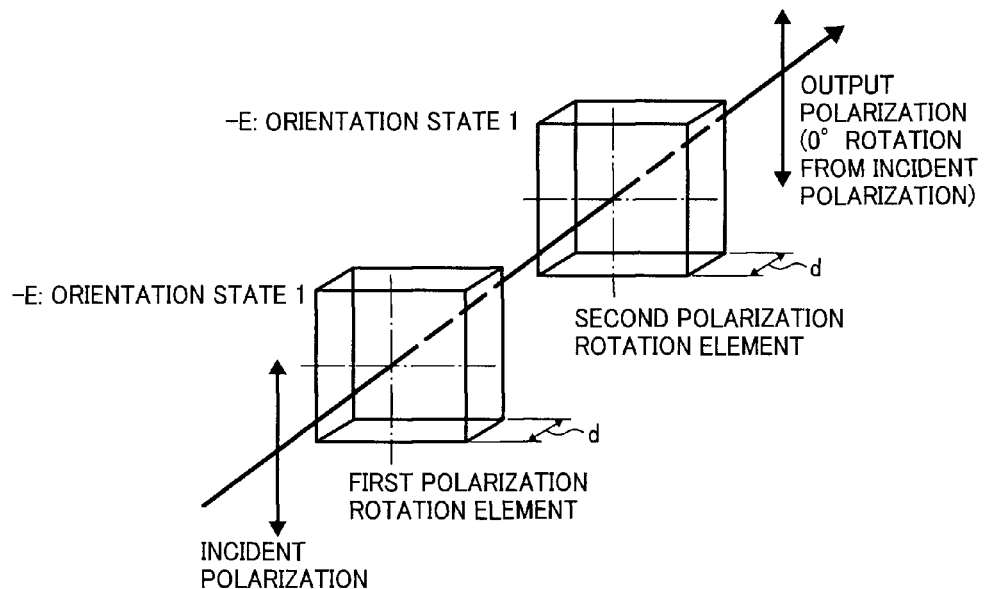
FIG. 20 is a diagram illustrating the behavior of the polarization switching devices in which multiple SSFLC elements are arranged in the optical axis direction.

FIG. 20 is a schematic diagram illustrating the behavior of a plurality of the polarization switching device 31 arranged in the optical axis direction of the SSFLC element described above. When an electric field of −E is applied between the transparent electrodes 29, the liquid crystal molecule (not shown) takes the orientation state 1 as illustrated in FIG. 20A. The incident polarized light is output while the polarization direction thereof is maintained.

Figure 20B:
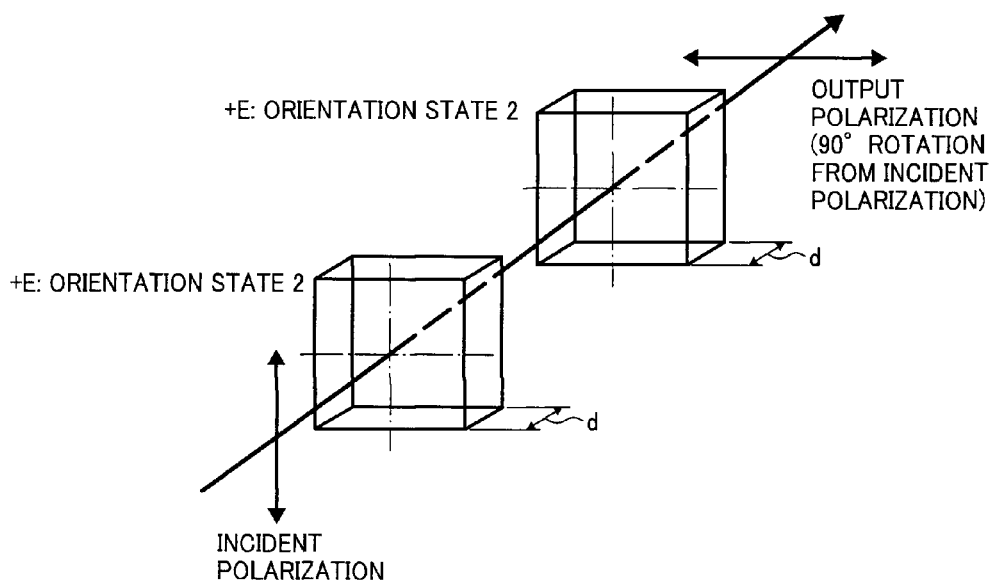

To the contrary, when an electric field of +E is applied between the transparent electrodes 29, the liquid crystal (not shown) takes the orientation state 2 as illustrated in FIG. 20B.

The output polarization is determined by the thickness (cell gap) d of the liquid crystal layer, the wavelength λ (e.g., 650 nm or 780 nm) and the fraction factor anisotropy Δn of the liquid crystal material at 650 nm or 780 nm. The following relationship: (first polarization rotation element: Δn×d)+(second polarization rotation element: Δn×d)=λ/2, is satisfied {(i.e., the half wave plate condition is satisfied in the case of the multiple (two in this case) SSFLC (polarization rotation) elements)} so that the polarization direction is 90° rotated from the incident polarization.

The incident polarization direction is preferably arranged to match the minor axis direction or the major axis direction of the liquid crystal molecule in one of the two orientation states of the liquid crystal-molecule orientation in the liquid crystal layer.

The polarization direction of the incident polarization is adjusted by the location of the phase plate. It is also possible to set the initial orientation of the liquid crystal molecule by the orientation treatment such as rubbing or rotate the liquid crystal element itself for adjustment.

In the structure in which multiple liquid crystals are provided in the optical axis direction, 90° polarization rotation is performed. Furthermore, multiple (two in this case) liquid crystal elements having the same thickness (cell gap) d and the cone angle 2θ are combined so that multiple (two in this case) liquid crystal elements can be manufactured in the same manner. Meaning that the productivity is improved in comparison with a structure formed of a combination of different elements.

Also, as illustrated in FIG. 19, the electric field control can be performed by a structure having elements arranged in parallel in which the same voltage is applicable, meaning sharing the same electric field application device. Therefore, the structure of the polarization switching device 31 can be made simple.

FIGS. 21 and 22 are schematic diagrams illustrating the behavior of a specific embodiment of the polarization switching device in which two of the SSFLC elements described above are arranged along the optical axis direction.

The two SSFLC (polarization rotation) elements have the same cell gap and the same cone angle 2θ (=45). The incident polarization direction is adjusted to the minor axis direction (or the major axis direction) of the orientation state 1 obtained when an electric field of −E is applied between the transparent electrodes of the two elements (refer to FIGS. 21A and 22A).

Figure 21A:
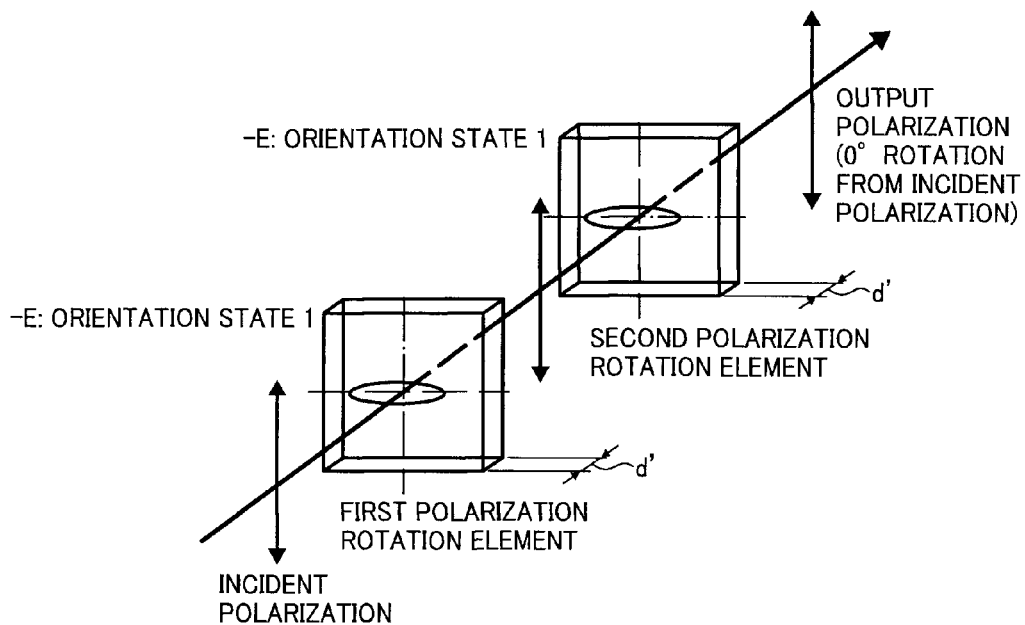
FIG. 21 is a schematic diagram illustrating the behavior of the polarization switching device in which two SSFLC elements are arranged in the optical axis direction with a cone angle 2θ of 45°.
Figure 21B:
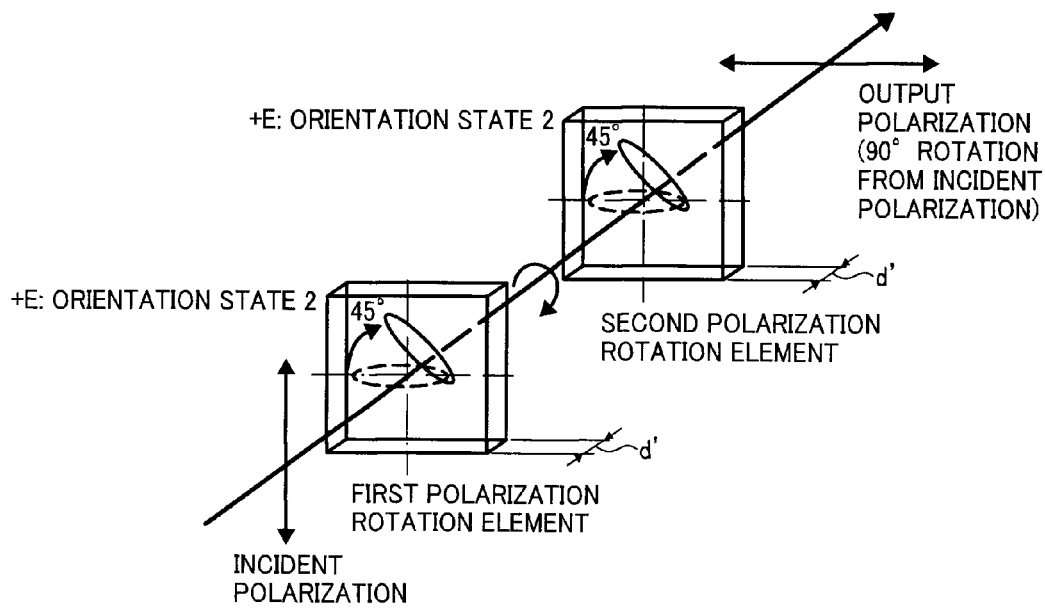
Figure 22A:
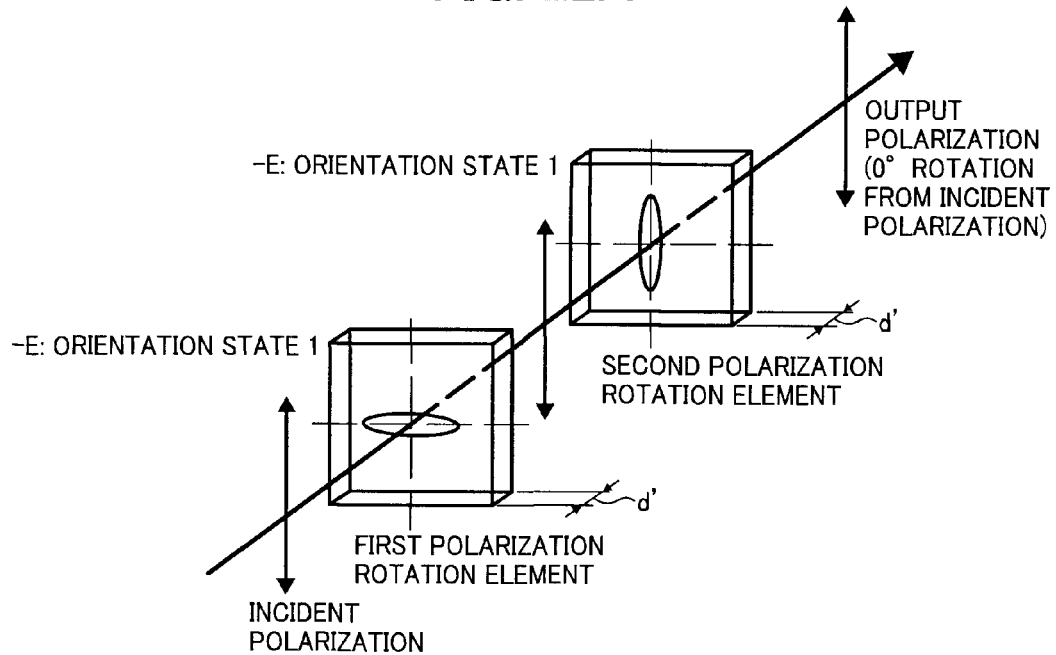
FIG. 22 is a schematic diagram illustrating the behavior of the polarization switching device in which two SSFLC elements are arranged differently in the optical axis direction with a cone angle 2θ of 45°.
Figure 22B:
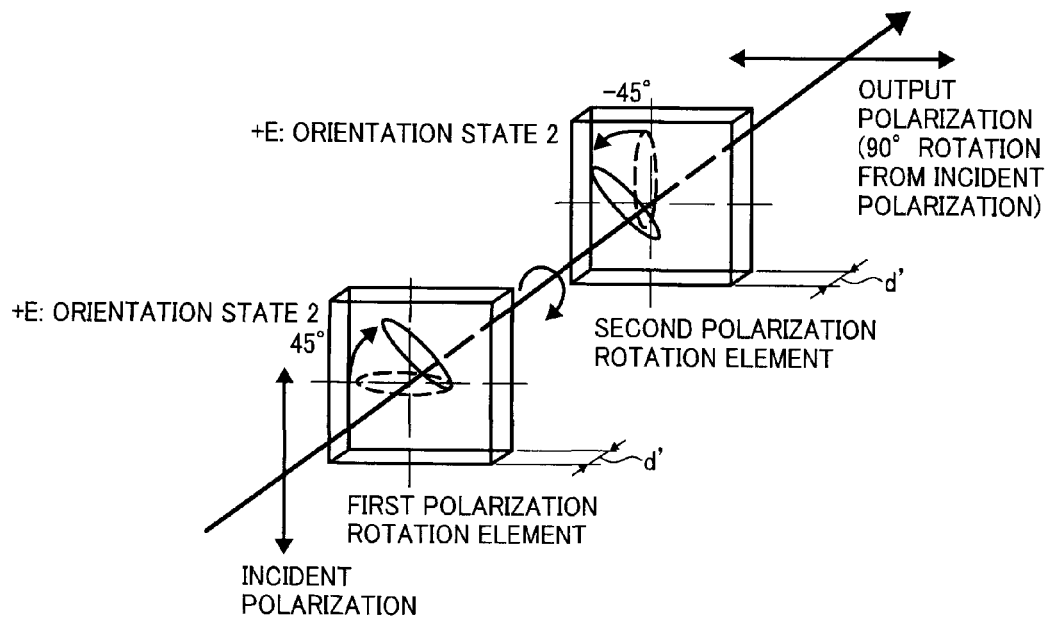

In addition, when an electric field of +E is applied between the transparent electrodes of the two elements, the liquid crystal molecules take the orientation state 2 in which the liquid crystal molecules are tilted at an angle of 45° (=cone angle 2θ) as illustrated in FIGS. 21B and 22B. The output polarization is determined by the thickness (cell gap) d' of the liquid crystal layer, the wavelength λ (e.g., 650 nm or 780 nm) and the fraction factor anisotropy Δn of the liquid crystal material at 650 nm or 780 nm. The following relationship: {first liquid crystal (polarization rotation) element}+{second liquid crystal (polarization rotation) element}: Δn×d'(=λ/4)+Δn×d'(=λ/4)=λ/2, is satisfied in the two SSFLC (polarization rotation) elements so that the polarization direction is 90° rotated from the incident polarization.

As illustrated in FIG. 21, the polarization state is ideally changed from a linear polarization to a circular polarization when light passes the first polarization rotation element, and is changed from the circular polarization to a linear polarization (90° rotated from the incident polarization to the first polarization rotation element) when the polarized light passes through the second polarization rotation element.

In such a structure, the cell gap of an element is small (i.e., d'<d) in comparison with the case of one polarization switching element having one SSFLC element so that a voltage to be applied can be reduced.

Ellipsometry of the liquid crystal element having the structure illustrated in FIG. 20 is verified by Simulation 2 using LCD master (manufactured by Shintec Inc.).

To analyze the polarization state in the ideal model with regard to the orientation state, the prerequisites are that the liquid crystal is nematic (ZLI-2293, manufactured by Merck Inc.), the application voltage is 0 V and the pre-tilt angle is 0°. The details of this Simulation 2 are shown in Tables 3 and 4.

Simulation 2
Calculation algorithm: 2×2 matrix
Atmosphere environment (refraction factor=1)
Transmission type
Incident light
Light source lamp: D65
Incident polarization direction: 0° (p-polarization)

TABLE 3

| (Structure) | |
|---|---|
| Structure | Thickness (nm) |
| Glass 1737 | 7.000e+005 |
| Liquid crystal | Refer to #2 in Table 4 |
| Glass 1737 | 7.000e+005 |
| Glass 1737 | 7.000e+005 |
| Liquid crystal | Refer to #1 in Table 4 |
| Glass 1737 | 7.000e+005 |

Detail About Liquid Crystal
Liquid crystal material: ZLI-2293 (manufactured by Merck Inc.)
Birefringence: Δn=(extraordinary light refraction factor $n_e$−ordinary light refraction factor $n_O$): 0.130 (=1.626−1.496)
Wavelength: 650 m

TABLE 4

| | Model 1 | Model 2 | Memo |
|---|---|---|---|
| | #2 | #2 | |
| Material | ZLI-2293 | ZLI-2293 | |
| Type | nematic | nematic | |
| Application voltage | 0.000 V | 0.000 V | |
| Cell gap d | 1.250 μm | 1.250 μm | |
| Chirality | 0.000 (rad/m) | 0.000 (rad/m) | |
| Pre-tilt angle | 0.0 deg. | 0.0 deg. | Light source side (light incident side) |
| | 0.0 deg. | 0.0 deg. | Observation side (light output side) |
| Torsion angle (Direction of liquid crystal molecule) | 0.0 deg. | 45.0 deg. | Light source side (light incident side) |
| | 0.0 deg. | 45.0 deg. | Observation side (light output side) |
| | #1 | #1 | |
| Material | ZLI-2293 | ZLI-2293 | |
| Type | nematic | nematic | |
| Application voltage | 0.000 V | 0.000 V | |
| Cell gap d | 1.250 μm | 1.250 μm | |
| Chirality | 0.000 (rad/m) | 0.000 (rad/m) | |

TABLE 4-continued

|  | Model 1 | Model 2 | Memo |
|---|---|---|---|
| Pre-tilt angle | 0.0 deg. | 0.0 deg. | Light source side (light incident side) |
|  | 0.0 deg. | 0.0 deg. | Observation side (light output side) |
| Torsion angle (Direction of liquid crystal molecule) | 0.0 deg. | 45.0 deg. | Light source side (light incident side) |
|  | 0.0 deg. | 45.0 deg. | Observation side (light output side) |
|  | ↓ | ↓ |  |
| P-polarization transmission ratio (Ep^2/S0) | 100% | 100% | Direction of light incident (wavelength: 650 nm) Angle of direction: 0 deg. Angle of tilt: 0 deg. |
| s-polarization transmission ratio (Es^2/S0) | 0% | 100% | Direction of light incident (wavelength: 650 nm) Angle of direction: 0 deg. Angle of tilt: 0 deg. |

Ep: the size of the space composition of the electric field Ep of transmission light
Es: the size of the space composition of the electric field Es of transmission light
S0: Stalks parameter The incident polarization direction in Simulation 2 is 0 (p-polarization) and the directions of the first liquid crystal molecule (#1) and of the second liquid crystal molecule (#2) in Model 1 is the same as that of p-polarization, i.e., 0° and 0°, respectively. Since the light is not sensitive to birefringence, the transmission ratio of p-polarization is 100% and the transmission ratio of s-polarization is 0%.

The directions of the first liquid crystal molecule (#1) and of the second liquid crystal molecule (#2) in Model 2 is tilted at an angle of 45° relative to p-polarization. Since the light is sensitive to birefringence and the following relationship: {first liquid crystal (polarization rotation) element}+{second liquid crystal (polarization rotation) element}: $\Delta n \times d'(=\lambda/4) + \Delta n \times d'(=\lambda/4) = \lambda/2$, is satisfied (i.e., the half wave plate condition is satisfied) so that the polarization direction is 90° rotated from the incident polarization.

In Simulation 2, λ is 650 nm, birefringence: Δn is 0.130, the cell gap d is 1.250 μm. Therefore, the relationship is satisfied and as the result of 90° polarization rotation, the transmission ratio of p-polarization is 0% and the transmission ratio of s-polarization is 100%. Therefore, 90° polarization rotation function is confirmed in an ideal model having the structure using multiple (two in this case) liquid crystal elements along the optical axis direction.

For reference, when the wavelength λ is 780 nm, since the liquid crystal has wavelength dispersion, slightly birefringence is small. When Δn is 0.125, the cell gap d (which has a 90° polarization rotation function) is 1.55 μm.

When Simulation 1 is compared with Simulation 2, the cell gaps (i.e., thicknesses) thereof are different. The cell gap in Simulation 2 is a half of that in Simulation 1. Therefore, the driving electric field can be reduced to a half in Simulation 2.

Figure 23A:
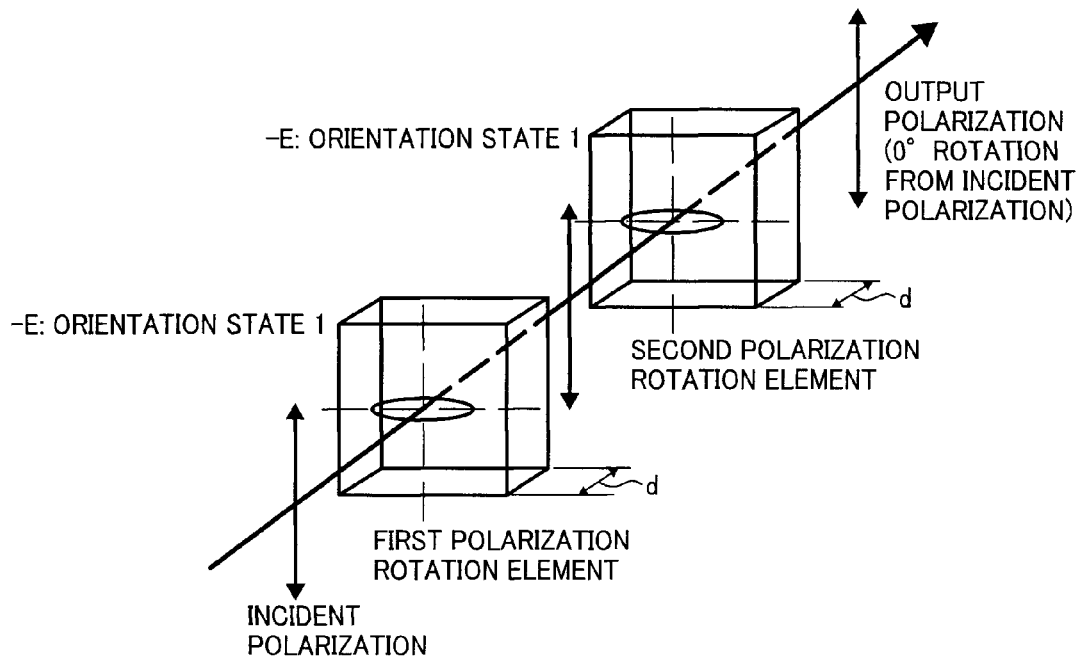
FIG. 23 is a schematic diagram illustrating the behavior of the polarization switching device in which two SSFLC elements are arranged in the optical axis direction with a cone angle 2θ of 22.5°.
Figure 23B:
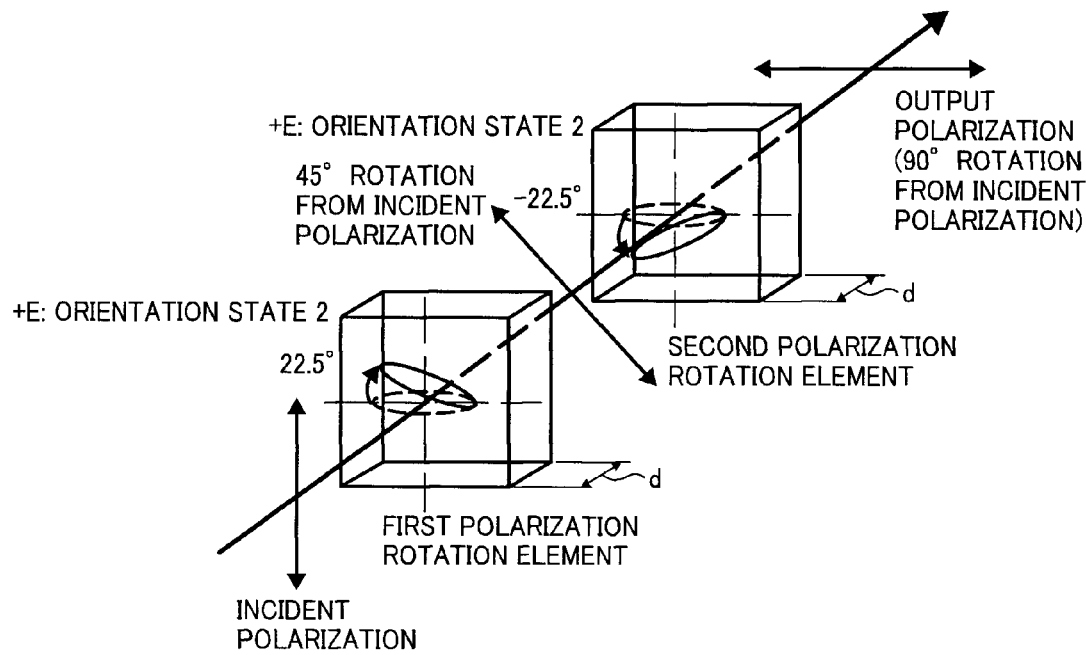
Figure 24A:
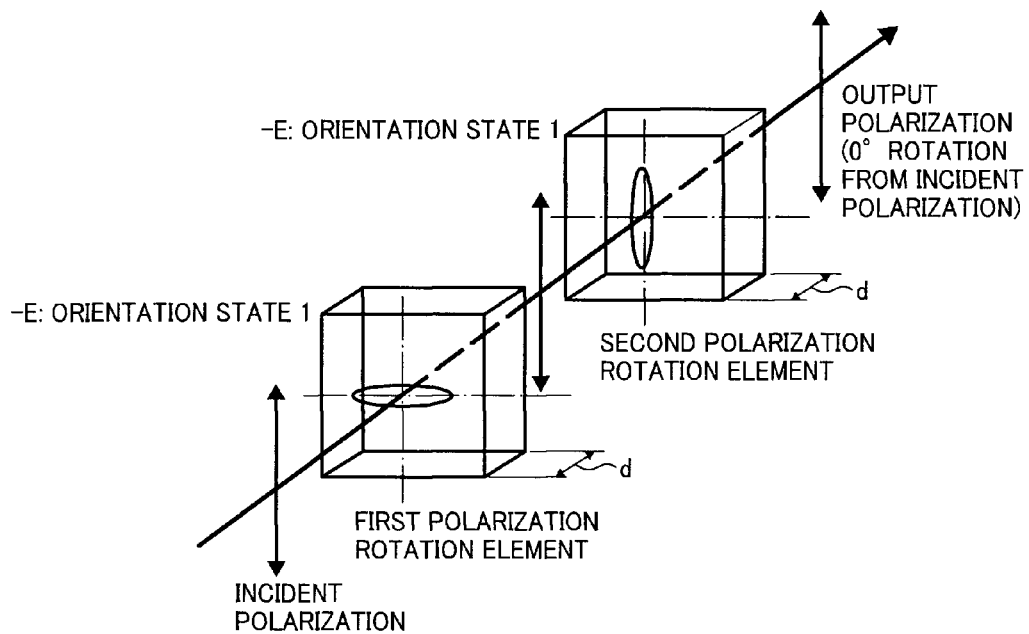
FIG. 24 is a schematic diagram illustrating the behavior of the polarization switching device in which two SSFLC elements are arranged differently in the optical axis direction with a cone angle 2θ of 22.5°;]
Figure 24B:
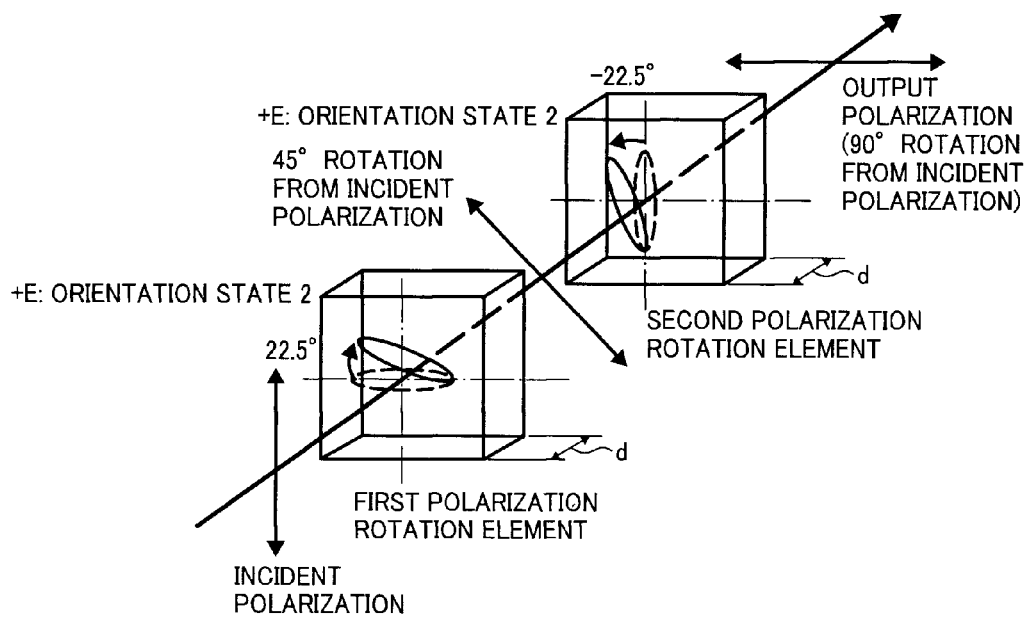

FIGS. 23 and 24 are schematic diagrams illustrating the behavior of another specific embodiment of the polarization switching device in which two of the SSFLC elements described above are arranged along the optical axis direction.

The two SSFLC (polarization rotation) elements have the same cell gap and the same cone angle 2θ (=22.5°). The incident polarization direction is adjusted to the minor axis direction (or the major axis direction) of the orientation state 1 obtained when an electric field of −E is applied between the transparent electrodes of the two elements (refer to FIGS. 23A and 24A).

In addition, when an electric field of +E is applied between the transparent electrodes of the two elements, the liquid crystal molecules take the orientation state 2 in which the liquid crystal molecules are tilted at an angle of the cone angle 2θ, i.e. + or −22.5° (the first element 22.5° and the second element is −22.5°) The output polarization is determined by the thickness (cell gap) d of the liquid crystal layer, the wavelength λ (e.g., 650 nm or 780 nm) and the fraction factor anisotropy Δn of the liquid crystal material at 650 nm or 780 nm. The following relationship: {first liquid crystal (polarization rotation) element}+{second liquid crystal (polarization rotation) element}: $\Delta n_1 \times d + \Delta n_2 \times d = \lambda/2$, is satisfied in the two SSFLC (polarization rotation) elements so that the polarization direction is 90° rotated from the incident polarization.

As illustrated in FIG. 23, this is because the polarized light which has passed the first polarization rotation element is (ideally) linear polarization rotated at an angle of 45° relative to the incident polarization direction and the polarized light which has passed the second polarization rotation element is (ideally) linear polarization rotated at an angle of another 45° relative to the polarized light which has passed the first polarization rotation element. In such a structure, the cone angle 2θ of a liquid crystal is small (i.e., 22.5°<45°) so that the response speed is accelerated.

Figure 25:
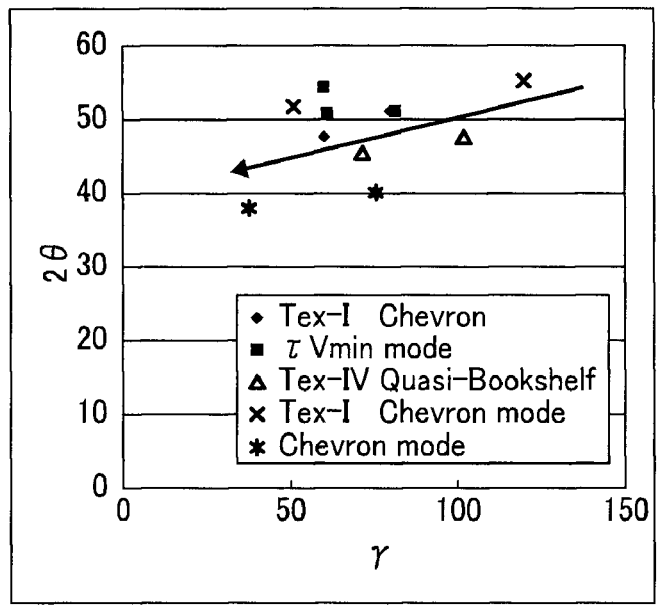
FIG. 25 is a graph illustrating the relationship between the viscosity γ of the SSFLC elements and the cone angle 2θ.

Improvement on the response speed is described with reference to FIG. 25 illustrating the relationship between the viscosity y of SSFLC and the cone angle 2θ (referring to the catalogue data of FLC manufactured by Clariant). The legends in FIG. 25 represent the difference of the orientation mode of FLC. It is found that as the cone angle 2θ decreases, the viscosity γ tends to be small in various orientation modes.

In general, the responsiveness of FLC can be approximated by the formula of γ/Ps×E (according to "Basis of Liquid Crystal and Display application" published by Corona Corporation). In the formula, Ps represents intrinsic polarization and E represents electric field. Although it depends on the relationships with the Ps and E, it is well known that the response speed increases when the viscosity γ is small.

Ellipsometry of the liquid crystal element having the structure illustrated in FIG. 24 is verified by Simulation 3 using LCD master (manufactured by Shintec Inc.).

To analyze the polarization state in the ideal model with regard to the orientation state, the prerequisites are that the liquid crystal is nematic (ZLI-2293, manufactured by Merck Inc.), the application voltage is 0 V and the pre-tilt angle is 0°. The details of this Simulation 3 are shown in Tables 5 and 6.

Simulation 3

Calculation algorithm: 2×2 matrix

Atmosphere environment (refraction factor=1)

Transmission type

Incident light

Light source lamp: D65

Incident polarization direction: 0° (p-polarization)

TABLE 5

(Structure)

| Structure | Thickness (nm) |
|---|---|
| Glass 1737 | 7.000e+005 |
| Liquid crystal | Refer to #2 in Table 6 |
| Glass 1737 | 7.000e+005 |
| Glass 1737 | 7.000e+005 |
| Liquid crystal | Refer to #1 in Table 6 |
| Glass 1737 | 7.000e+005 |

Detail About Liquid Crystal

Liquid crystal material: ZLI-2293 (manufactured by Merck Inc.)

Birefingence: $\Delta n$=(extraordinary light refraction factor $n_e$–ordinary light refraction factor $n_O$): 0.130 (=1.626−1.496)

Wavelength: 650 m

| | Model 1 | Model 2 | Memo |
|---|---|---|---|
| | #2 | #2 | |
| Material | ZLI-2293 | ZLI-2293 | |
| Type | nematic | nematic | |
| Application voltage | 0.000 V | 0.000 V | |
| Cell gap d | 1.250 μm | 1.250 μm | |
| Chirality | 0.000 (rad/m) | 0.000 (rad/m) | |
| Pre-tilt angle | 0.0 deg. | 0.0 deg. | Light source side (light incident side) |
| | 0.0 deg. | 0.0 deg. | Observation side (light output side) |
| Torsion angle (Direction of liquid crystal molecule) | 0.0 deg. | −22.5 deg. | Light source side (light incident side) |
| | 0.0 deg. | −22.5 deg. | Observation side (light output side) |
| | #1 | #1 | |
| Material | ZLI-2293 | ZLI-2293 | |
| Type | nematic | nematic | |
| Application voltage | 0.000 V | 0.000 V | |
| Cell gap d | 1.250 μm | 1.250 μm | |
| Chirality | 0.000 (rad/m) | 0.000 (rad/m) | |
| Pre-tilt angle | 0.0 deg. | 0.0 deg. | Light source side (light incident side) |
| | 0.0 deg. | 0.0 deg. | Observation side (light output side) |
| Torsion angle (Direction of liquid crystal molecule) | 0.0 deg. | 22.5 deg. | Light source side (light incident side) |
| | 0.0 deg. | 22.5 deg. | Observation side (light output side) |
| | ↓ | ↓ | |
| P-polarization transmission ratio (Ep^2/S0) | 100% | 100% | Direction of light incident (wavelength: 650 nm) Angle of direction: 0 deg. Angle of tilt: 0 deg. |
| s-polarization transmission ratio (Es^2/S0) | 0% | 100% | Direction of light incident (wavelength: 650 nm) Angle of direction: 0 deg. Angle of tilt: 0 deg. |

Ep: the size of the space composition of the electric field Ep of transmission light
Es: the size of the space composition of the electric field Es of transmission light
S0: Stalks parameter The incident polarization direction in Simulation 3 is 0° (p-polarization) and the directions of the first liquid crystal molecule (#1) and of the second liquid crystal molecule (#2) in Model 1 is the same as that of p-polarization, i.e., 0° and 0°, respectively. Since the light is not sensitive to birefringence, the transmission ratio of p-polarization is 100% and the transmission ratio of s-polarization is 0%.

The directions of the first liquid crystal molecule (#1) and of the second liquid crystal molecule (#2) in Model 2 is tilted at an angle of 22.5° and −22.5°, respectively, relative to p-polarization. Since the light is sensitive to birefringence and the following relationship: {first liquid crystal (polarization rotation) element}+{second liquid crystal (polarization rotation) element}: $\Delta n1 \times d + \Delta n2 \times d = \lambda/2$, is satisfied (i.e., the half wave plate condition is satisfied) so that the polarization direction is 90° rotated from the incident polarization.

In Simulation 3, λ is 650 nm, birefringence Δn is 0.130, the cell gap d is 2.5 μm. Therefore, the relationship is satisfied and as the result of 90° polarization rotation, the transmission ratio of p-polarization is 0% and the transmission ratio of s-polarization is 100%. Therefore, 90° polarization rotation function is confirmed in the ideal model having the structure using multiple (two in this case) liquid crystal elements along the optical axis direction.

In a structure of the polarization switching device having multiple SSFLC elements along the optical axis direction, when the elements have the same cone angle and the cone angle 2θ is around 45°, a transmission ratio of not less than 90% of a desired polarization component is secured in an range of from 32° to 58° (an allowance of 13°). When the cone angle 2θ is 22.5° C., the range is from 12.5° to 32.5° (an allowance of 10°). Although it depends on how such elements are applied, there is no practical problem.

In addition, to secure a particular transmission ratio of a desired polarization component, it is preferred that the cone angle 2θ1 of the first SSFLC element and the cone angle 2θ2 of the second SSFLC element have the following relationship: $0.9 \times (90+2\theta1)/2 \leq 2\theta2 \leq 1.1 \times (90+2\theta1)/2$.

The fourth embodiment is described with reference to FIGS. 26 and 27.

To make the beam from a light source incident into the top and the bottom polygon mirrors based on time splitting in the optical scanning device described above, the response speed of switching light paths is a key.

As described above, the light paths are switched by controlling an electric field applied to an active diffraction optical element or polarization switching element. Therefore, liquid crystal is used in such a structure to manufacture an inexpensive element. The liquid crystal material is dependent on temperature in general. As the temperature dependency is high, the viscosity thereof decreases. Consequently, the response speed of the liquid crystal material increases (Refer to FIG. 17).

In this embodiment, a temperature control device is provided to continuously obtain a high response speed at switching light paths.

As the temperature control device, it is possible to directly provide a temperature control element such as a peltiert device or a small heater to an active diffraction optical element or polarization switching element which has an impact on the responsiveness of light path switching.

In such a structure, the element is directly controlled about the temperature thereof. Therefore, the time to be taken before the temperature of the element reaches to a target temperature is short and subtle temperature control is possible. In general, since a peltiert device is expensive, it is preferred to use a small heater such as a ceramic heater.

In addition, a temperature control device can be provided to an optical scanning device to adjust the temperature in the optical scanning unit.

Figure 26:
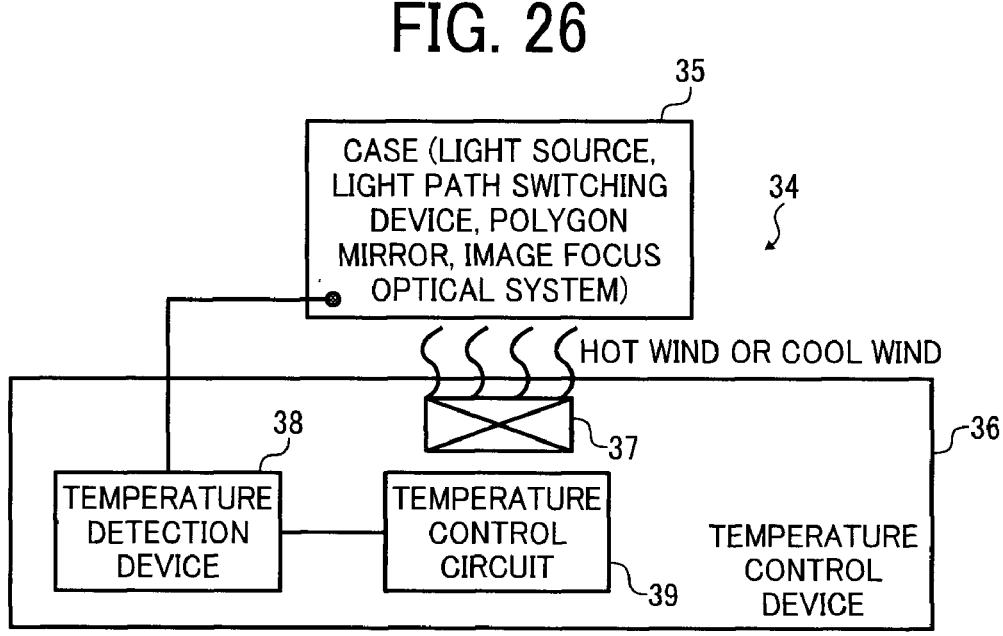
FIG. 26 is a diagram illustrating the structure block chart of the optical scanning device of the fourth embodiment described later.

FIG. 26 is a schematic diagram illustrating an optical scanning device to which a temperature control device is provided. An optical scanning device 34 related to this embodiment includes a case 35 which covers optical parts (not shown) such as a light source, a light path switching device, a polygon mirror and an image focus optical system, and a temperature control device 36 which controls the temperature in the case 35.

The temperature control device 36 includes a heat source 37 provided near the outer surface of the case 35, a temperature detection device 38 which detects the temperature in the case 35 and a temperature control circuit 39 which controls the heat source 37 according to the detection signal from the temperature detection device 38. In this case, a heater is used as the heat source 37 to control the temperature. For example, a heater can be structured of a heat source and a heat diffusion board. The air heated by the heat source is uniformly diffused by the heat diffusion board. In addition, it is also possible to control the temperature in the device by controlling the amount of air blown by a fan. It is preferred to provide a silicon-controlled rectifier or a thermostat to control the temperature in a particular range.

For example, when a liquid crystal element having a responsiveness illustrated in FIG. 17 is used to switch light paths, it is possible to maintain a high speed response (not greater than 0.5 msec) by setting the temperature range by the temperature control device 36 within from 30 to 40° C. When a liquid crystal element having the responsiveness described in the second embodiment is used to switch light paths, it is possible to maintain a high speed response (not greater than 25 μsec) by setting the temperature range by the temperature control device 36 within from 30 to 40° C.

In a system in which the heat source 37 is provided outside the case 35 to control the temperature inside the case 35, the response speed to the temperature change is slow, which possibly reduces the response speed of the optical parts in the case 35, for example, the light path switching device, which has a sensitiveness to the temperature change.

Figure 27:
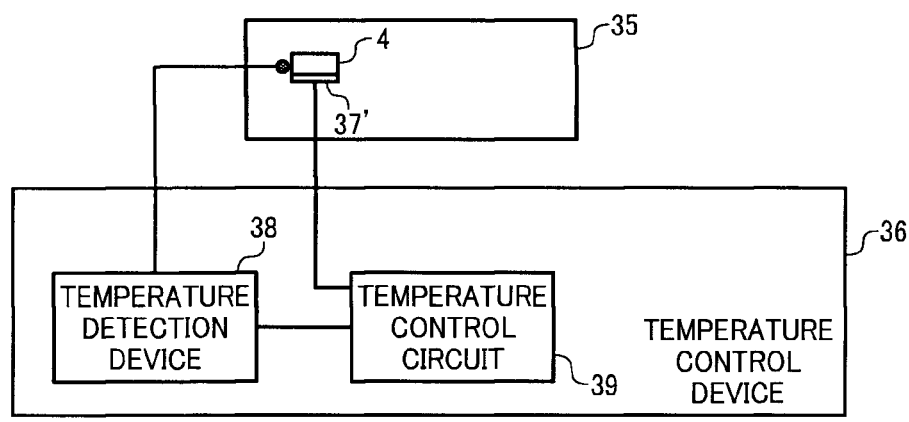
FIG. 27 is a diagram illustrating the structure block chart of a variation of the optical scanning device of the fourth embodiment described later.

In such a case, as illustrated in FIG. 27, a heat source 37' which is suitable for the heat capacity of the light path switching device 4 is directly provided thereto and also the temperature detection device 38 is located to detect the temperature around the light path switching device 4 to maintain a suitable response speed.

As a device to detect the temperature, for example, a thermistor or a thermo couple can be used. A thermo couple is preferred according to the following reasons: A thermistor does not have a good linearity of the resistor temperature change characteristics and the measuring accuracy thereof is low; A thermo couple has a large thermal electromotive force with little variation in characteristics, which leads to good interchangeability; In addition, a thermo couple is stable to heat and has a long working life, which leads to high reliability. Materials regulated by JIS, for example, K (chromel-alumel), J (iron-constantan), T (copper-constantan), E (chromel-constantan) and N (nichrocyl-nicyl) and materials outside JIS such as Nickel-Nickel 18% molybdenum, tungsten 5% rhenium-tungsten 26% rhenium can be used.

A specific structure of the optical scanning device described above is described as the fifth embodiment.

Figure 28:
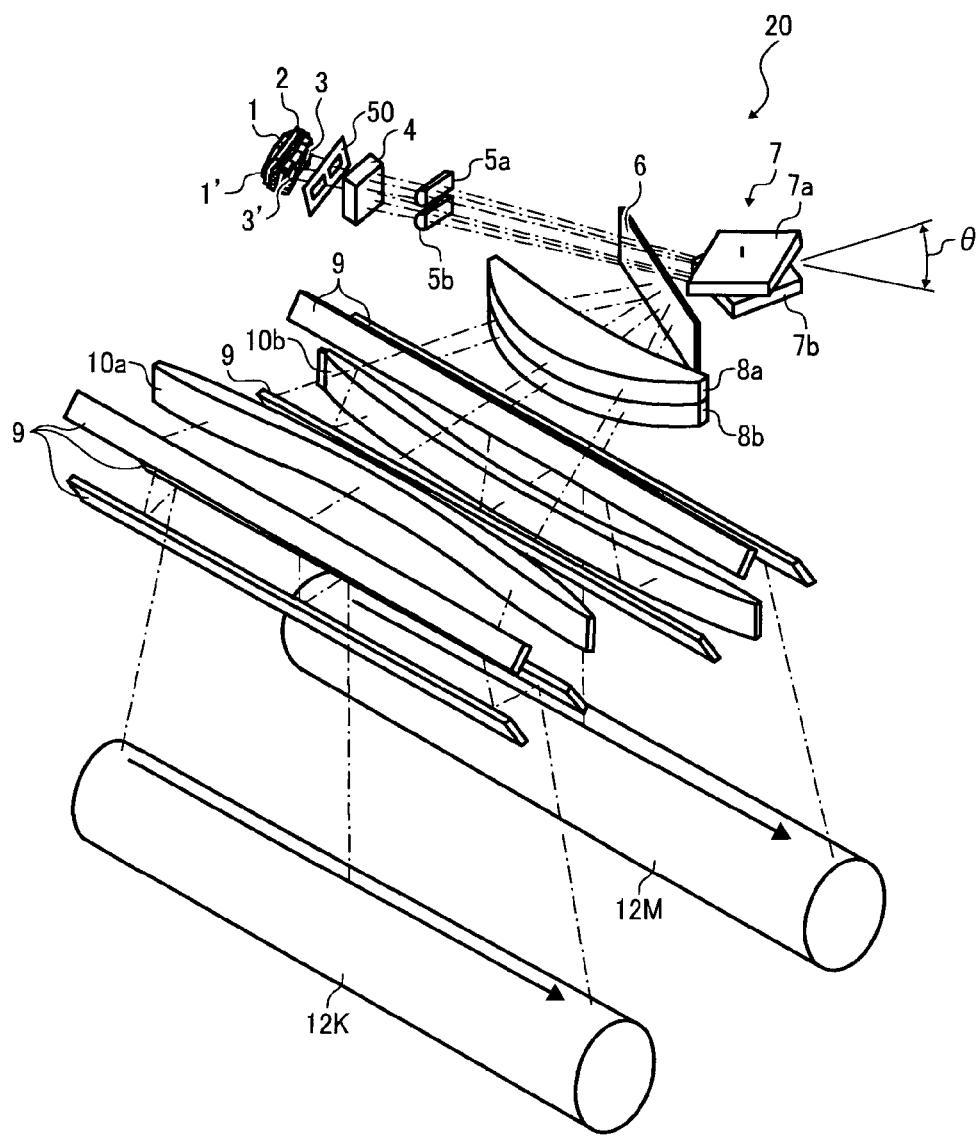
FIG. 28 is a diagram illustrating a perspective view of part of the optical scanning device related to the fifth embodiment described later.

FIG. 28 is a schematic cross section illustrating a structure of the optical scanning device related to the fifth embodiment. In FIG. 28, the reference numerals 1 and 1' represent a semiconductor laser as a light source, 2 represents an LD (semiconductor laser) base, 3 and 3' are coupling lenses, 4 is a light path switching device described above, 5a and 5b represent cylindrical lenses, 6 represents a sound proofing glass, 7 (7a and 7b) represents the polygon mirror functioning as the deflection device, 8a and 8b represent first scanning lenses, 9 is a mirror, 10a and 10b represent second scanning lenses, 12 represents the surface of an image bearing member which is scanned, and 50 represents an aperture stop.

The coupling lenses 3 and 3', the light path switching device 4, and the cylindrical lenses 5a and 5b form a first image focus optical system. The first scanning lenses 8a and 8b, the mirror 9 and the second scanning lens 10 form a second image focus optical system.

In FIG. 28, a structure having only two image bearing members 12M and 12K is illustrated but actually four image bearing members are scanned since the two other same optical systems as illustrated in FIG. 28 are provided with the deflection device 7 therebetween.

Two diffusion beams output from the semiconductor lasers 1 and 1' are converted into weak converged beams, parallel beams or weak diffusion beams by the coupling lenses 3 and 3'.

The beams output from the coupling lenses 3 and 3' pass the aperture stop 50 which is provided to stabilize the beam diameter on the scanned surface and is incident into the light path switching device 4. As described above, the beams are switched by the light path switching device 4.

The beams switched by the light path switching device 4 are converted into line images long in the main scanning direction around the polarization reflection surface by the cylindrical lenses 5 and 5'. The deflection device 7 includes the concentric polygon mirrors 7a and 7b which are provided on the top stack and the bottom stack with a tilt angle from each other in the rotation direction. In this case, the tilt angle is 45°.

The polygon mirrors 7a and 7b have the same shape and are structured of any polygonal shape in principle. These are overlapped such that the center angle of a side of one polygonal shape is approximately halved by a point of the other polygonal shape.

As described above, the beam from the top polygon mirror scans the surface of the image bearing member 12K and the beam from the bottom polygon mirror scans the surface of the image bearing member 12M on a different timing from that for the top polygon mirror.

The light path switching signal in the light path switching device 4 is set based on the scanning synchronization signal detected by a synchronization reception device (not shown) such as a photodiode provided outside the effective scanning width.

Instead of the light path switching device 4, a structure having a polarization switching device and a polarization separation device can be used.

As the light source, as illustrated in FIG. 29, a surface emitting laser (VCSEL) effective to increase the density can be used.

In this embodiment, the optical scanning device 20 is illustrated. This is true to the optical scanning devices 20' and 34.

Figure 30:
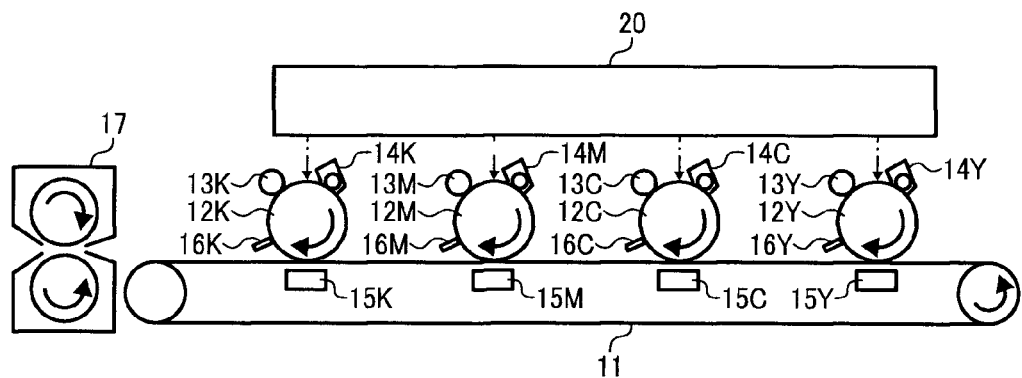
FIG. 30 is schematic diagram illustrating the image forming apparatus of the sixth embodiment described later.

Referring to FIG. 30, a tandem type color image forming apparatus (sixth embodiment) using the optical scanning device described above is described.

The color image forming apparatus includes four image bearing members 12Y, 12C, 12M and 12K arranged along the travel direction of a transfer belt 11. Around the image bearing member 12Y for forming a yellow image, a charging device 13Y, a developing device 14Y, a transfer device 15Y and a cleaning device 16Y are sequentially arranged relative to the rotation direction indicated by an arrow. The same structure is provided for the other colors. The letter Y, M, C, K represent yellow, magenta, cyan and black, respectively. The reference numerals 13, 14 and 15 represent the numerals with Y, M, C, and K thereof to describe the behavior thereof in common.

The charging device 13 is a charging member which forms a charger to uniformly charge the surface of the image bearing member 12. The optical scanning device 20 irradiates the surface of the image bearing member 12 with a beam between the charging device 13 and the developing device 14 to form a latent electrostatic image on the image bearing member 12.

Based on the latent electrostatic image, a toner image is formed on the surface of the image bearing member 12 by the developing device 14. Each color toner image is sequentially transferred by a transfer device 15 to a recording medium (transfer sheet) traveled by the transfer belt 11. The image overlapped on the recording medium is fixed by a fixing device 17.

In this embodiment, the optical scanning device 20 is illustrated. The same applies to the optical scanning devices 20' and 34.

In an image forming apparatus using an optical scanning device which switches light paths by controlling an electric field as described above, the light path of a laser light source is switched and the amount of light is modulation-driven according to the scanning recording from multiple polygon mirrors. Therefore, image bearing members corresponding to each color are sequentially scanned. Thus, this image forming apparatus produces images at a high speed without a loss of the beam power while the number of the light sources is reduced.

This document claims priority and contains subject matter related to Japanese Patent Application No. 2007-148365 and filed on Jun. 4, 2007, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed is:

1. An optical scanning device comprising:
a light source;
a deflection device configured to deflect light beam from the light source;
an image focus optical system configured to focus an image on a surface scanned by the light beam deflected by the deflection device;
a polarization switching device provided between the light source and the deflection device and in which a refraction factor varies depending on application of an acting force; and
a polarization separation device provided between the light source and the deflection device,
wherein a plurality of surfaces are scanned by varying a timing with which the light beam is deflected while a light path for the light beam from the light source is switched, and
wherein the polarization switching device comprises a pair of transparent substrates, an orientation film sandwiched between the transparent substrates on an inner side of the substrates, a liquid crystal layer comprising a chiral smectic C phase layer having homogeneous orientation by the orientation film, and an acting force application device which applies an acting force in a substantially perpendicular direction relative to the transparent substrates.

* * * * *